United States Patent
Fukami et al.

(10) Patent No.: US 9,951,166 B2
(45) Date of Patent: Apr. 24, 2018

(54) FLUORINE-CONTAINING, SILICON-CONTAINING POLYMER AND SURFACE TREATMENT AGENT

(71) Applicant: DAIKIN INDUSTRIES, LTD., Osaka-shi, Osaka (JP)

(72) Inventors: Dai Fukami, Settsu (JP); Tomohiro Yoshida, Settsu (JP); Tomomi Irita, Settsu (JP); Takabumi Nagai, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 15 days.

(21) Appl. No.: 14/784,444

(22) PCT Filed: Mar. 31, 2014

(86) PCT No.: PCT/JP2014/059495
§ 371 (c)(1),
(2) Date: Oct. 14, 2015

(87) PCT Pub. No.: WO2014/171321
PCT Pub. Date: Oct. 23, 2014

(65) Prior Publication Data
US 2016/0060376 A1  Mar. 3, 2016

(30) Foreign Application Priority Data

Apr. 15, 2013 (JP) ................. 2013-084932

(51) Int. Cl.
| | | |
|---|---|---|
| C08F 230/08 | (2006.01) | |
| G02B 1/04 | (2006.01) | |
| C08G 81/02 | (2006.01) | |
| C08G 77/442 | (2006.01) | |
| C08G 77/385 | (2006.01) | |
| G02B 1/14 | (2015.01) | |
| C08J 5/00 | (2006.01) | |
| C08G 65/00 | (2006.01) | |
| C09D 171/00 | (2006.01) | |

(52) U.S. Cl.
CPC .......... *C08F 230/08* (2013.01); *C08G 65/007* (2013.01); *C08G 77/385* (2013.01); *C08G 77/442* (2013.01); *C08G 81/02* (2013.01); *C08J 5/00* (2013.01); *C09D 171/00* (2013.01); *G02B 1/04* (2013.01); *G02B 1/14* (2015.01); *C08G 2650/48* (2013.01); *C08J 2343/04* (2013.01)

(58) Field of Classification Search
USPC ......................................... 526/247
See application file for complete search history.

(56) References Cited

U.S. PATENT DOCUMENTS

| | | | | |
|---|---|---|---|---|
| 6,183,872 B1 * | 2/2001 | Tanaka | ................. | C08G 65/007 106/287.13 |
| 2016/0289488 A1 * | 10/2016 | Yoshida | ................... | C09D 7/12 |

FOREIGN PATENT DOCUMENTS

| | | | |
|---|---|---|---|
| JP | 2007-106785 A | | 4/2007 |
| JP | 2010-143092 | * | 7/2010 |
| JP | 2010-143092 A | | 7/2010 |
| JP | 2011-001437 | * | 1/2011 |
| JP | 2011-1437 A | | 1/2011 |
| JP | 2011-20099 A | | 2/2011 |
| JP | 2011-21158 A | | 2/2011 |
| JP | 2011-184527 | * | 9/2011 |
| JP | 2011-184527 A | | 9/2011 |
| WO | 97/07155 A1 | | 2/1997 |

OTHER PUBLICATIONS

International Preliminary Report on Patentability dated Oct. 20, 2015 issued in counterpart application No. PCT/JP2014/059495.
International Search Report for PCT/JP2014/059495 dated Jun. 3, 2014.

* cited by examiner

*Primary Examiner* — Mark Kaucher
*Assistant Examiner* — Henry Hu
(74) *Attorney, Agent, or Firm* — Sughrue Mion, PLLC

(57) ABSTRACT

The present invention provides a fluorine-containing and silicon-containing polymer of the general formula (A) or (B) (wherein each symbol is as defined in the description) which is useful for forming a surface treatment layer having water-repellency, oil-repellency and antifouling property and excellent surface slip property.

25 Claims, No Drawings

FLUORINE-CONTAINING, SILICON-CONTAINING POLYMER AND SURFACE TREATMENT AGENT

CROSS REFERENCE TO RELATED APPLICATIONS

This application is a National Stage of International Application No. PCT/JP2014/059495 filed Mar. 31, 2014, claiming priority based on Japanese Patent Application No. 2013-084932, filed Apr. 15, 2013, the contents of all of which are incorporated herein by reference in their entirety.

TECHNICAL FIELD

The present invention relates to a fluorine-containing and silicon-containing polymer and a surface treatment agent comprising the polymer.

BACKGROUND ART

A certain fluorine-containing silane compound is known to be able to provide excellent water-repellency, oil-repellency, antifouling property, or the like when it is used on a surface treatment of a base material. A layer formed from the surface treatment agent comprising a fluorine-containing silane compound is applied to various base materials such as a glass, a plastic, a fiber and a building material as a so-called functional thin film.

Conventionally, in particular, in use of an optical member, a base material formed of an inorganic glass has been used. In order to prevent adhering of a fouling such as fingerprints, a layer is formed by using a fluorine containing compound on the base material as an antifouling coating. As such fluorine containing compound, a surface treatment agent comprising a fluorine containing silane compound having a perfluoropolyether group and a hydroxyl group or a hydrolyzable group which bind to Si as an active ingredient is known (Patent Literature 1). However, in this case, since a bonding between a silanol group and a hydroxyl group are used, the base material is limited to glass, silicon, a metal oxide film, or the like.

On the other hand, recently, use of transparent plastics such as acrylic resin and polycarbonate has been expanded as a material in place of the inorganic glass since they are lightweight and processing of them is easy. It is desired to form the antifouling coating also when the resin material is used. However, since the fluorine containing silane compound as described in Patent Literature 1 is not conformable to the base material formed of the resin material, it is hard to fix on the surface of the base material. As a method of forming a layer less subjected to peeling on a surface of a base material formed of various materials such as resin, a method using a curable composition which is obtained by adding a curable compound having a perfluoropolyether structure and a curable compound having a polysiloxane structure and a perfluoropolyether structure in combination into a curable composition comprising a compound having two or more polymerizable unsaturated groups is known (Patent Literature 2).

PRIOR ART LITERATURE

Patent Literature

Patent Literature 1: WO 97/07155 A
Patent Literature 2: JP 2010-143092 A

SUMMARY OF THE INVENTION

Problem to be Solved by the Invention

However, recently, under a circumstance where a smartphone and a tablet terminal spread rapidly, with respect to use of a touch panel, it is desired to provide excellent touch sense when users touch to and operate the display panel with their finger, that is, excellent surface slip property. However, it is difficult that the conventional surface treatment composition sufficiently meets the increased requirements for both surface slip property.

An object of the present invention is to provide a novel compound useful for forming a layer having excellent surface slip property in addition to water-repellency, oil-repellency and antifouling property on a base material consisting of various materials comprising a resin and a surface treatment agent comprising the compound.

As a result of intensively studying, the inventors of the present invention have found that use of a specific fluorine-containing and silicon-containing polymer having a curable moiety between a perfluoropolyether structure and a polysiloxane structure enables a formation of the layer having excellent surface slip property in addition to water-repellency, oil-repellency and antifouling property on a surface of a base material even when the base material consists of various materials comprising a resin, and the inventors reach the present invention.

Therefore, according to the first aspect of the present invention, there is provided a fluorine-containing and silicon-containing polymer of the general formula (A) or (B):

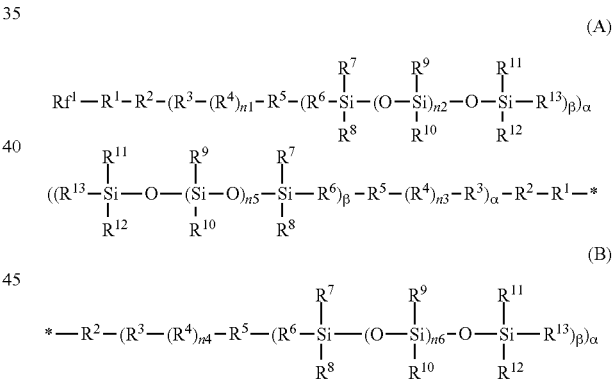

wherein:
Rf$^1$ is an alkyl group having 1-16 carbon atoms which may be substituted by one or more fluorine atoms;
R$^1$ is —(OC$_4$F$_8$)$_a$—(OC$_3$F$_6$)$_b$—(OC$_2$F$_4$)$_c$—(OCF$_2$)$_d$—
wherein a, b, c and d are each independently an integer of 0-200, the sum of a, b, c and d is at least 1, and the occurrence order of the respective repeating units in parentheses is not limited in the formula; R$^2$ is each independently at each occurrence a 2- to 7-valent organic group;
R$^3$ is each independently at each occurrence a divalent organic group;
R$^4$ is each independently at each occurrence R$^{4a}$ or R$^{4b}$: provided that at least one of R$^4$ is R$^{4a}$;
R$^{4a}$ is each independently at each occurrence a divalent organic group having a curable moiety;
R$^{4b}$ is each independently at each occurrence a divalent organic group having no curable moiety;

$R^5$ is each independently at each occurrence —O—, —S—, —NH— or a single bond;

$R^6$ is each independently at each occurrence a 2- to 7-valent organic group;

$R^7$, $R^8$, $R^9$, $R^{10}$, $R^{11}$, $R^{12}$ and $R^{13}$ are, each independently, an alkyl group or an aryl group;

n1 is an integer of 1-50;

n3 and n4 are each independently an integer of 0-50, and the sum of n3 and n4 is one or more;

n2, n5 and n6 are each independently an integer of 0-500;

α is each independently an integer of 1-6; and

β is each independently an integer of 1-6.

Therefore, according to the second aspect of the present invention, there is provided a process for producing the fluorine-containing and silicon-containing polymer of the formulae (A) and (B) in claim 1 comprising (1) cationic polymerizing a cationic polymerizable monomer in the presence of a perfluoropolyether group-containing cationic polymerization initiator and a Lewis acid, and (2) stopping the cationic polymerization reaction by using an alkanol group-containing polysiloxane.

Therefore, according to the third aspect of the present invention, there is provided a surface treatment agent comprising a fluorine-containing and silicon-containing polymer.

Therefore, according to the fourth aspect of the present invention, there is provided an article comprising a base material and a layer which is formed on a surface of the base material from the surface treatment agent.

Effect of the Invention

According to the present invention, there is provided a newly fluorine-containing and silicon-containing polymer having a curable moiety between a perfluoropolyether structure and the polysiloxane structure. By using the fluorine-containing and silicon-containing polymer in a surface treatment agent, a layer (hereinafter, referred to as a "surface-treating layer") having water-repellency, oil-repellency and antifouling property as well as excellent surface slip property can be formed.

EMBODIMENTS TO CARRY OUT THE INVENTION

In the present specification, unless otherwise specified, "a perfluoropolyether group" means a monovalent or divalent "perfluoropolyether group (a perfluoro(poly)ether group)". The "monovalent perfluoropolyether group" means a perfluoroalkyl group in which an etheric oxygen atom is inserted into one or more carbon-carbon bonds. The "divalent perfluoropolyether group" means a perfluoroalkylene group in which an etheric oxygen atom is inserted into one or more carbon-carbon bonds. In the present specification, there is a case that a perfluoropolyether group is referred to as abbreviation: PFPE.

In the present specification, unless otherwise specified, examples of the "perfluoroalkyl group" include, for example, a perfluoroalkyl group having 1-12 carbon atoms (preferably 1-6, more preferably 1-3). The "perfluoroalkyl group" may be straight or branched, preferably straight.

In the present specification, the "perfluoroalkylene group" means a divalent group which is derived by removing a fluorine atom directly binding to a carbon atom of the main backbone of the perfluoroalkyl group. Examples of the "perfluoroalkylene group" include, unless otherwise specified, for example, a perfluoroalkylene group having 1-12 carbon atoms (preferably 1-6, more preferably 1-3). The "perfluoroalkylene group" may be straight or branched, preferably straight.

In the present specification, unless otherwise specified, examples of the "alkyl group", for example, an alkyl group having 1-12 carbon atoms (preferably, 1-6, more preferably 1-3, further preferably 1) (e.g. a methyl group, an ethyl group, a propyl group, an isopropyl group). The "alkyl group" may be straight or branched, preferably straight.

In the present specification, unless otherwise specified, "a hydrocarbon group" means a group containing a carbon atom and a hydrogen atom. Examples of the hydrocarbon group include, but are not particularly limited to, a hydrocarbon group having 1-20 carbon atoms which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

In the present specification, unless otherwise specified, examples of the substituents of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like which may be substituted by one or more halogen atoms.

In the present specification, unless otherwise specified, "an organic group" or "a monovalent organic group" means a group containing a carbon atom. Examples of the "organic group" or the "monovalent organic group" include, but are not particularly limited to, the above-mentioned hydrocarbon group. "A divalent organic group" means a divalent group which is derived by further removing one hydrogen atom from the "monovalent organic group".

Hereinafter, the fluorine-containing and silicon-containing polymer of the present invention will be described.

The present invention provides a fluorine-containing and silicon-containing polymer of a general formula (A) or (B) (hereinafter, also referred to as a "fluorine-containing and silicon-containing polymer (A)" and a "fluorine-containing and silicon-containing polymer (B)", respectively).

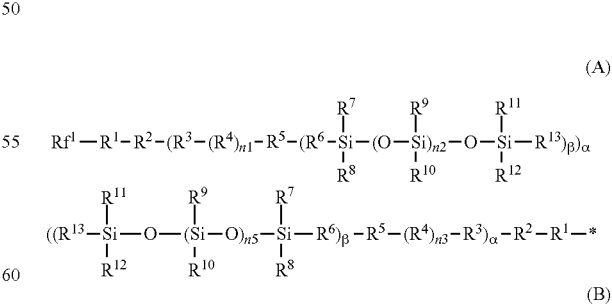

In the formulae (A) and (B), $Rf^1$ is an alkyl group having 1-16 carbon atoms which may be substituted by one or more fluorine atoms. The alkyl group having 1-16 carbon atoms is a straight or branched alkyl group having 1-16 carbon atoms which may be substituted by one or more fluorine atoms, preferably, a straight or branched alkyl group having 1-3 carbon atoms which may be substituted by one or more fluorine atoms, more preferably a straight alkyl group having 1-3 carbon atoms which may be substituted by one or more fluorine atoms. More preferably, the "alkyl group" is a perfluoroalkyl group, specifically, —$CF_3$, —$CF_2CF_3$ or —$CF_2CF_2CF_3$.

In the formulae (A) and (B), $R^1$ is a perfluoro(poly)ether group of the formula: —$(OC_4F_8)_a$—$(OC_3F_6)_b$—$(OC_2F_4)_c$—$(OCF_2)_d$—. In the formula, a, b, c and d are each independently an integer of 0-200, for example, an integer of 1-200, the sum of a, b, c and d is at least 1, and the occurrence order of the respective repeating units in parentheses is not limited in the formula. Preferably, a, b, c and d are each independently an integer of 0-50. Preferably, the sum of a, b, c and d is 1 or more and 1000 or less, preferably 1 or more and 500 or less, more preferably 5 or more and 150 or less. Among the repeating units in parentheses with the subscript a, b, c or d, the —$(OC_4F_8)$— group may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, preferably —$(OCF_2CF_2CF_2CF_2)$—. The —$(OC_3F_6)$— group may be any of —$(OCF_2CF_2CF_2)$—, —$(OCF(CF_3)CF_2)$— and —$(OCF_2CF(CF_3))$—, preferably —$(OCF_2CF_2CF_2)$—. The —$(OC_2F_4)$— group may be any of —$(OCF_2CF_2)$— and —$(OCF(CF_3))$—, preferably —$(OCF_2CF_2)$—.

In one embodiment, $R^1$ is —$(OC_3F_6)_b$— wherein b is an integer of 1-200. Preferably, $R^1$ is —$(OCF_2CF_2CF_2)_b$— wherein b is an integer of 1-200.

In another embodiment, $R^1$ is —$(OC_4F_8)_a$—$(OC_3F_6)_b$—$(OC_2F_4)_c$—$(OCF_2)_d$— wherein a and b are each independently an integer of 0-30, c and d are each independently an integer of 1-200, and the occurrence order of the respective repeating units in parentheses is not limited. Preferably, $R^1$ is —$(OCF_2CF_2CF_2CF_2)_a$—$(OCF_2CF_2CF_2)_b$—$(OCF_2CF_2)_c$—$(OCF_2)_d$—wherein a and b are each independently an integer of 0-30, c and d are each independently an integer of 1-200, and the occurrence order of the respective repeating units in parentheses is not limited.

A lower limit of a number average molecular weight of the perfluoro(poly)ether group of the formula: —$(OC_4F_8)_a$—$(OC_3F_6)_b$—$(OC_2F_4)c$—$(OCF_2)_d$— is preferably about 1,000, more preferably about 1,500, further preferably about 2,000 in view of obtaining high oil-repellency and high water-repellency. A higher limit is preferably about 100,000, more preferably about 50,000, further preferably about 10,000 in view of obtaining high solubility in a general-purpose solvent (a fluorine-free organic solvent).

In the formulae (A) and (B), $R^2$ represents each independently at each occurrence a 2- to 7-valent organic group. In a compound of the formulae (A) and (B), $R^2$ is recognized to be a portion of a linker connecting between a perfluoropolyether part ($R^1$) and an $R^4$ part having curable moiety. Therefore, the $R^2$ group may be any 2- to 7-valent organic group as long as the compound of the formulae (A) and (B) can stably exist. In addition, depending on the valence of the $R^2$ group, α in the formula becomes an integer of 1-6, for example, when $R^2$ is a divalent organic group, α is 1, and when $R^2$ is a 7-valent organic group, α is 6.

In a preferably embodiment, $R^2$ is a 2- to 4-valent organic group and α is 1-3, more preferably, $R^2$ is a divalent organic group and α is 1.

In more preferably embodiment, $R^2$ is a group of the formula: —$(Q)_e$—$(CFZ)_f$—$(CH_2)_g$—. In the formula, e, f and g are each independently an integer of 0-10, the sum of e, f and g is 1 or more, and the occurrence order of the respective repeating units in parentheses is not limited in the formula.

In the above formula, Q represents each independently at each occurrence an oxygen atom, phenylene, carbazolylene, —$NR^a$— (wherein $R^a$ represents a hydrogen atom or an organic group), or a divalent organic group. Preferably, Q is an oxygen atom or a divalent polar group.

Examples of the "divalent polar group" in Q include, but are not particularly limited to, —C(O)—, —C(=$NR^b$)— and —C(O)$NR^b$— wherein $R^b$ represents a hydrogen atom or a lower alkyl group. The "lower alkyl group" is, for example, an alkyl group having 1-6 carbon atoms, for example, methyl, ethyl, n-propyl, which may be substituted by one or more fluorine atoms.

In the above formula, Z is each independently at each occurrence a hydrogen atom, a fluorine atom or a lower fluoroalkyl group, preferably a fluorine atom. The "lower fluoroalkyl group" is, for example, a fluoroalkyl group having 1-6 carbon atoms, preferably 1-3 carbon atoms, preferably a perfluoroalkyl group having 1-3 carbon atoms, more preferably a trifluoromethyl group, and a pentafluoroethyl group, further preferably a trifluoromethyl group.

$R^2$ is preferably a group of the formula: —$(O)_e$—$(CF_2)_f$—$(CH_2)_g$— wherein e, f and g are as defined above, and the occurrence order of the respective repeating units in parentheses is not limited in the formula.

Examples of the group of the formula: —$(O)_e$—$(CF_2)_f$—$(CH_2)_g$— include, for example, —$(O)_{e'}$—$(CH_2)_{g''}$—O—$[(CH_2)_{g'''}$—O—$]_{g''''}$, and —$(O)_{e'}$—$(CF_2)_{f'}$—$(CH_2)_{g''}$—O—$[(CH_2)_{g'''}$—O—$]_{g''''}$wherein e' is 0 or 1, f", g" and g''' are each independently an integer of 1-10, and g'' is 0 or 1. It is noted that a left side of these groups is attached to an $R^1$ side.

In a preferable embodiment, $R^2$ may be a group of the following formula (V):

—$(R^{26})_p$—$(X^{21})_q$—$R^{27}$—     (V)

wherein:

$R^{26}$ represents —$(CH_2)_s$— or an o-, m- or p-phenylene group, preferably —$(CH_2)_s$—;

$R^{27}$ represents —$(CH_2)_t$— or an o-, m- or p-phenylene group, preferably —$(CH_2)_t$—;

$X^{21}$ represents —$(X^{22})_r$—;

$X^{22}$ represents each independently at each occurrence a group selected from a group consisting of —O—, —S—, an o-, m- or p-phenylene group, —C(O)O—, —$CONR^{25}$—, —O—$CONR^{25}$—, —$NR^{25}$—, —$Si(R^{23})_2$—, —$(Si(R^{23})_2O)_m$—$Si(R^{23})_2$— and —$(CH_2)_v$—;

$R^{23}$ represents each independently at each occurrence a phenyl group or a $C_{1-6}$ alkyl group, preferably a $C_{1-6}$ alkyl group, more preferably a methyl group;

$R^{25}$ represents each independently at each occurrence a hydrogen atom, a phenyl group or a $C_{1-6}$ alkyl group (preferably, a methyl group);

m is each independently at each occurrence an integer of 1-100, preferably an integer of 1-20;

v is each independently at each occurrence an integer of 1-20, preferably an integer of 1-6, more preferably an integer of 1-3;

s is an integer of 1-20, preferably an integer of 1-6, more preferably an integer of 1-3, further preferably 1 or 2;

t is an integer of 1-20, preferably an integer of 2-6, more preferably an integer of 2-3;

r is an integer of 1-10, preferably an integer of 1-5, more preferably an integer of 1-3;

p is 0 or 1; and q is 0 or 1.

Preferably, the group of the formula (V) described above may be a $C_{1-20}$ alkylene group, —$R^{26}$—$X^3$—$R^{27}$—, or

—$X^4$—$R^{27}$— wherein $R^{26}$ and $R^{27}$ are as defined above.

More preferably, the group of the formula (V) described above is a $C_{1-20}$ alkylene group, —$(CH_2)_s$—$X^3$—$(CH_2)_t$—, or —$X^4$—$(CH_2)_t$— wherein s and t are as defined above.

In the above-described formula, $X^3$ represents

—O—,

—S—,

—C(O)O—,

—$CONR^{25}$—,

—O—$CONR^{25}$—,

—$Si(R^{23})_2$—,

—$(Si(R^{23})_2O)_m$—$Si(R^{23})_2$—,

—O—$(CH_2)_u$—$(Si(R^{23})_2O)_m$—$Si(R^{23})_2$—,

—$CONR^{25}$—$(CH_2)_u$—$(Si(R^{23})_2O)_m$—$Si(R^{23})_2$—,

—$CONR^{25}$—$(CH_2)_v$—$N(R^{25})$—, or

—$CONR^{25}$-(o-, m- or p-phenylene)-$Si(R^{23})_2$— wherein $R^{23}$, $R^{25}$, m and v are as defined above, u is an integer of 1-20, preferably an integer of 2-6, more preferably an integer 2-3. $X^3$ is preferably —O—.

In the above-described formula, $X^4$ represents

—S—,

—C(O)O—,

—$CONR^{25}$—,

—$CONR^{25}$—$(CH_2)_u$—$(Si(R^{23})_2O)_m$—$Si(R^{23})_2$—,

—$CONR^{25}$—$(CH_2)_v$—$N(R^{25})$—, or

—$CONR^{25}$-(o-, m- or p-phenylene)-$Si(R^{23})_2$—.

More preferably, the group of the formula (V) described above may be a $C_{1-20}$ alkylene group, —$(CH_2)_s$—$X^3$—$(CH_2)_t$—, or —$X^4$—$(CH_2)_t$— wherein each symbol is as defined above.

Further preferably, the group of the formula (V) described above is a $C_{1-20}$ alkylene group, —$(CH_2)_s$—O—$(CH_2)_t$—, —$(CH_2)_s$—$(Si(R^{23})_2O)_m$—$Si(R^{23})_2$—$(CH_2)_t$—, or —$(CH_2)_s$—O—$(CH_2)_u$—$(Si(R^{23})_2O)_m$—$Si(R^{23})_2$—$(CH_2)_t$—, wherein each symbol is as defined above.

Specific examples of X include, for example:

—$CH_2O(CH_2)_2$—,

—$CH_2O(CH_2)_3$—,

—$CH_2O(CH_2)_6$—,

—$CH_2O(CH_2)_3Si(CH_3)_2OSi(CH_3)_2(CH_2)_2$—,

—$CH_2O(CH_2)_3Si(CH_3)_2OSi(CH_3)_2OSi(CH_3)_2(CH_2)_2$—,

—$CH_2O(CH_2)_3Si(CH_3)_2O(Si(CH_3)_2O)_2Si(CH_3)_2(CH_2)_2$—,

—$CH_2O(CH_2)_3Si(CH_3)_2O(Si(CH_3)_2O)_3Si(CH_3)_2(CH_2)_2$—,

—$CH_2O(CH_2)_3Si(CH_3)_2O(Si(CH_3)_2O)_{10}Si(CH_3)_2(CH_2)_2$—,

—$CH_2O(CH_2)_3Si(CH_3)_2O(Si(CH_3)_2O)_{20}Si(CH_3)_2(CH_2)_2$—,

—$(CH_2)_2$—,

—$(CH_2)_3$—,

—$(CH_2)_4$—,

—$(CH_2)_6$—,

—CONH—$(CH_2)_3$—,

—$CON(CH_3)$—$(CH_2)_3$—,

—CON(Ph)-$(CH_2)_3$— wherein Ph represents a phenyl group,

—CONH—$(CH_2)_6$—,

—$CON(CH_3)$—$(CH_2)_6$—,

—CON(Ph)-$(CH_2)_6$— wherein Ph represents a phenyl group,

—CONH—$(CH_2)_2NH(CH_2)_3$—,

—CONH—$(CH_2)_6NH(CH_2)_3$—,

—$CH_2O$—CONH—$(CH_2)_3$—,

—$CH_2O$—CONH—$(CH_2)_6$—,

—S—$(CH_2)_3$—,

—$(CH_2)_2S(CH_2)_3$—,

—CONH—$(CH_2)_3Si(CH_3)_2OSi(CH_3)_2(CH_2)_2$—,

—CONH—$(CH_2)_3Si(CH_3)_2OSi(CH_3)_2OSi(CH_3)_2(CH_2)_2$—,

—CONH—$(CH_2)_3Si(CH_3)_2O(Si(CH_3)_2O)_3Si(CH_3)_2(CH_2)_2$—,

—CONH—$(CH_2)_3Si(CH_3)_2O(Si(CH_3)_2O)_{10}Si(CH_3)_2(CH_2)_2$—,

—CONH—$(CH_2)_3Si(CH_3)_2O(Si(CH_3)_2O)_{20}Si(CH_3)_2(CH_2)_2$—

—C(O)O—$(CH_2)_3$—,

—C(O)O—$(CH_2)_6$—,

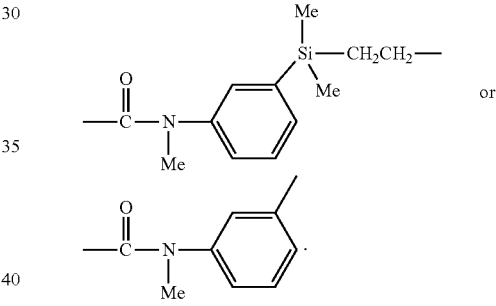

Other examples of the $R^2$ include, for example the following groups:

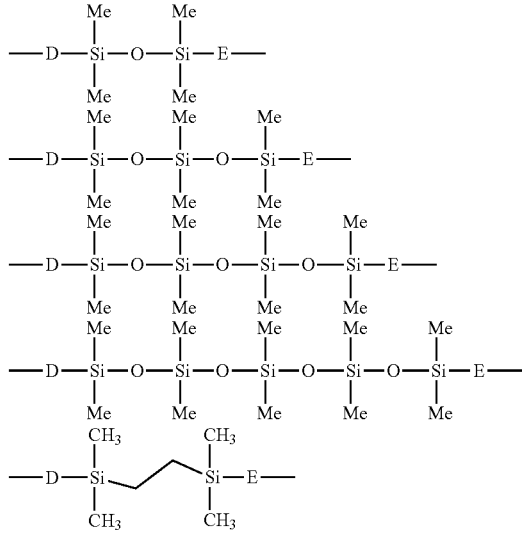

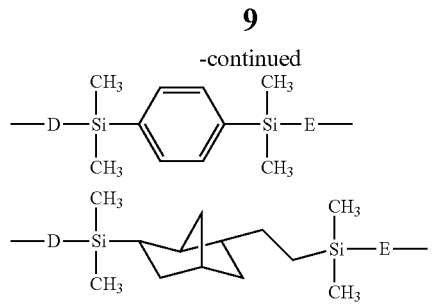

wherein D a group selected from
—CH₂O(CH₂)₂—,
—CH₂O(CH₂)₃—,
—CF₂O(CH₂)₃—,
—(CH₂)₂—,
—(CH₂)₃—,
—(CH₂)₄—,
—CONH—(CH₂)₃—,
—CON(CH₃)—(CH₂)₃—,
—CON(Ph)-(CH₂)₃— wherein Ph represents a phenyl group, and

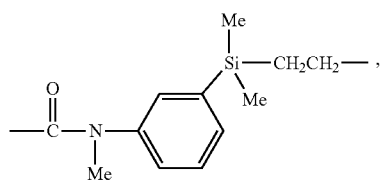

E is —(CH₂)$_n$— wherein n is an integer of 2-6, and

D is attached to R¹ of a main molecular chain of the formula (A) or the formula (B), and E is attached to R³ of the main molecular chain of the formula (A) or the formula (B).

Further other examples of R² include the following groups:

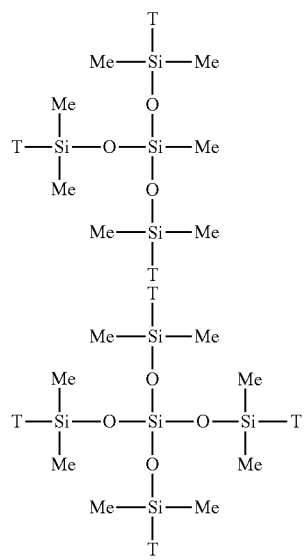

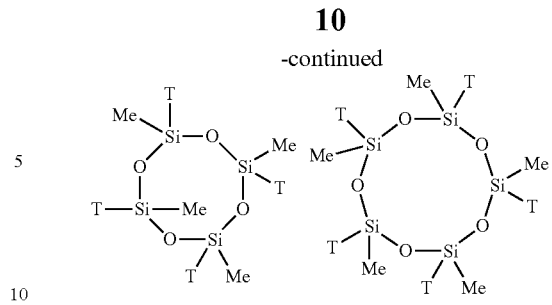

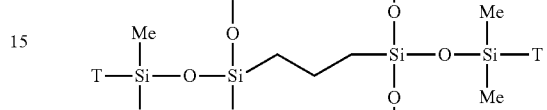

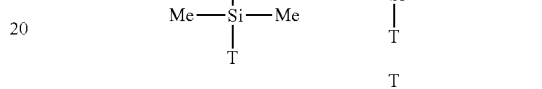

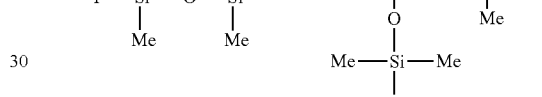

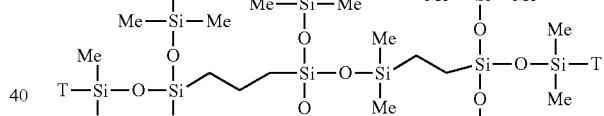

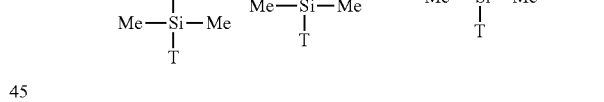

wherein any one of T is a following group attached to the main molecular chain of the formula (A) or the formula (B):

—CH₂O(CH₂)₂—,
—CH₂O(CH₂)₃—,
—CF₂O(CH₂)₃—,
—(CH₂)₂—,
—(CH₂)₃—,
—(CH₂)₄—,
—CONH—(CH₂)₃—,
—CON(CH₃)—(CH₂)₃—,
—CON(Ph)-(CH₂)₃— wherein Ph represents a phenyl group, or

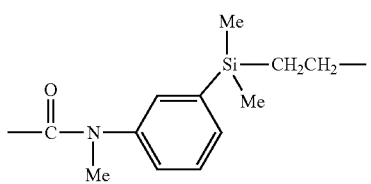

at least one of other T is —(CH$_2$)$_n$— wherein n is an integer of 2-6 which is attached to R$^3$ of the main molecular chain of the formula (A) or the formula (B), if present, the other T are each independently a methyl group or a phenyl group.

The above R$^2$ group may be substituted by one or more substituents selected from a fluorine atom, a C$_{1-3}$ alkyl group and a C$_{1-3}$ fluoroalkyl group (preferably, a C$_{1-3}$ perfluoroalkyl group).

In the formulae (A) and (B), R$^3$ represents a divalent organic group.

R$^3$ group is preferably a liner or branched alkyl group having 1-20 carbon atoms, more preferably —C(R$^{3a}$)(R$^{3b}$)—. In the formula, R$^{3a}$ and R$^{3b}$ are each independently a hydrogen atom or an alkyl group, preferably one of R$^{3a}$ and R$^{3b}$ is an alkyl group.

In the formulae (A1) and (A2), R$^4$ is each independently at each occurrence R$^{4a}$ or R$^{4b}$. However, one of R$^4$ is R$^{4a}$.

R$^{4a}$ represents each independently at each occurrence a divalent organic group having a curable moiety.

Examples of the "curable moiety" include, but are not particularly limited to, for example, an allyl group, a cinnamate group, a sorbate group, an acryloyl group and a methacryloyl group (hereinafter, the acryloyl group and the methacryloyl group are generally referred to as "a (meth) acryloyl group").

The preferable curable moiety varies depending on a material to be subjected to coating. For example, when the material is amorphous synthetic resin (e.g. an acrylic resin), the "curable moiety" is, preferably, an allyl group, a cinnamate group, a sorbate group or CH$_2$=CX$^1$—C(O)— wherein X$^1$ represents a hydrogen atom, a chlorine atom, a fluorine atom or an alkyl having 1-10 carbon atoms which may be substituted by a fluorine atom (e.g. a (meth)acryloyl group), more preferably an acryloyl group and a methacryloyl group.

R$^{4a}$ is preferably a group of the following formula:

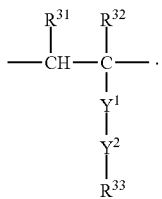

In the above formula, R$^{31}$ represents each independently at each occurrence a hydrogen atom or an alkyl group. R$^{31}$ is preferably a hydrogen atom.

In the above formula, R$^{32}$ represents each independently at each occurrence a hydrogen atom or an alkyl group. The R$^{32}$ is, preferably a methyl group or a hydrogen atom, more preferably, a hydrogen atom.

In the above formula, R$^{33}$ represents each independently at each occurrence an organic group having a curable moiety.

Examples of the curable moiety include the same group as the above-mentioned group, and are preferably CH$_2$=CX$^1$—C(O)— wherein X represents a hydrogen atom, a chlorine atom, a fluorine atom or an alkyl having 1-10 carbon atoms which may be substituted by a fluorine atom, specifically, CH$_2$=C(CH$_3$)—C(O)— or CH$_2$=CH—C(O)—.

In the above formula, Y$^1$ represents —O—, —N(R$^c$)—, phenylene or carbazolylene. In the formula, R$^c$ represents an organic group, preferably an alkyl group.

Y$^1$ is preferably —O—, phenylene or carbazolylene, more preferably, —O— or phenylene, further preferably —O—.

In the above formula, Y$^2$ represents a linker wherein the number of atoms of the main backbone is 1-16 (more preferably 2-12, further preferably 2-10).

Examples of Y$^2$ include, but are not particularly limited to, for example,

—(CH$_2$—CH$_2$—O)$_{p1}$— (p1 represents an integer of 1-10, for example, an integer of 2-10), —(CHR$^d$)$_{p2}$—O— (p2 is an integer of 1-40, and R$^d$ represents a hydrogen atom or a methyl group), —(CH$_2$—CH$_2$—O)$_{p3}$—CO—NH—CH$_2$—CH$_2$—O— (p3 represents an integer of 1-10),

—CH$_2$—CH$_2$O—CH$_2$—CH$_2$—,

—(CH$_2$)$_{p4}$— (p4 represents an integer of 1-6),

—(CH$_2$)$_{p5}$—O—CONH—(CH$_2$)$_{p6}$— (p5 represents an integer of 1-8, preferably 2 or 4, and p6 represents an integer of 1-6, preferably 3) or —O— (provided that Y$^1$ is not —O—).

Preferable Y$^2$ is —(CH$_2$—CH$_2$—O)$_{p1}$— (p1 represents an integer of 1-10) or —(CHR$^d$)$_{p2}$—O— (p2 is an integer of 1-40, and R$^d$ represents a hydrogen atom or a methyl group), specifically —CH$_2$—CH$_2$—O—. It is noted that in these groups, the left terminal binds to the main backbone side (Y$^1$ side), and the right terminal binds to the curable moiety side (R$^{33}$ side).

R$^{4a}$ is more preferably a group of the following formula.

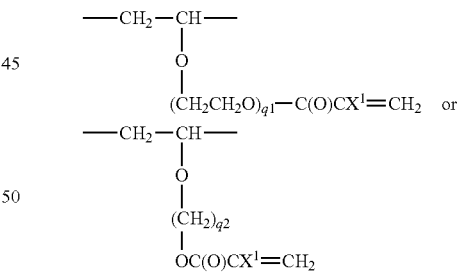

In the above formula, X$^1$ represents a hydrogen atom, a chlorine atom, a fluorine atom or an alkyl having 1-10 carbon atoms which may be substituted by a fluorine atom, preferably an alkyl group having 1-10 carbon atoms, for example, a methyl group. q1 is an integer of 1-10, preferably an integer of 1-5, for example 1. q2 is an integer of 1-10, preferably an integer of 1-5, for example 2.

R$^{4b}$ is each independently at each occurrence a divalent organic group having no curable moiety.

R$^{4b}$ is preferably —(CHR$^{4c}$—CR$^{4d}$R$^{4e}$)$_s$. In the formula, R$^{4c}$ and R$^{4d}$ represent, each independently, a hydrogen atom or an alkyl group, s is an integer from 0 to 50, preferably s is 0, and R$^{4e}$ group is -Q'-R$^{4f}$. Q' has the same definition as that of Q and $R^{4f}$ is an organic group having no curable moiety, in which $R^{4g}$ group described below binds to Q' directly or via a linker.

The linker is preferably,
(a) —$(CH_2—CH_2—O)_{s1}$— (s1 represents an integer of 1-10,
(b) —$(CHR^{4h})_{s2}$—O— (s2 represents an integer of 1-40, and $R^{4h}$ represents a hydrogen atom or a methyl group),
(c) —$(CH_2—CH_2—O)_{s1}$—CO—NH—$CH_2$—$CH_2$—O— (s1 is as defined above),
(d) —$CH_2$—$CH_2$—O—$CH_2$—$CH_2$—,
(e) —$(CH_2)_{s3}$— (s3 represents an integer of 1-6),
(f) —$(CH_2)_{s4}$—O—CONH—$(CH_2)_{s5}$— (s4 represents an integer of 1-8, preferably 2 or 4, and s5 represents an integer of 1-6, preferably 3), or
(g) —O—(provided that Q' is not —O—).

$R^{4g}$ is preferably a following group.
(i) an alkyl group
For example: methyl, ethyl
(ii) a chain group containing an alkyl group substituted by fluorine atoms
For example:

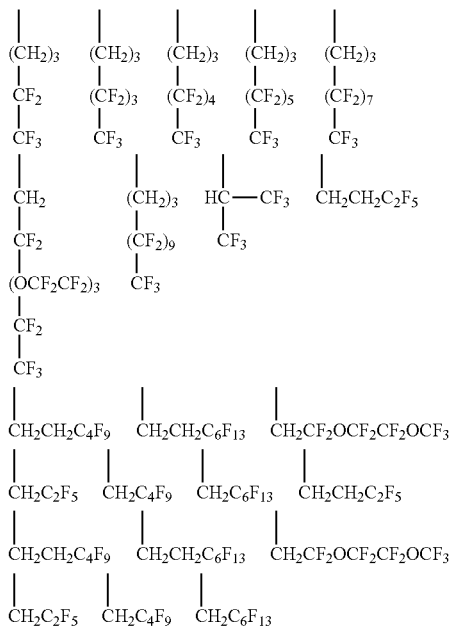

(iii) a group having one or more ring moieties selected from the group consisting of a monocyclic carbocyclic ring, a bicyclic carbocyclic ring, a tricyclic carbocyclic ring and a tetracyclic carbocyclic ring
For example:

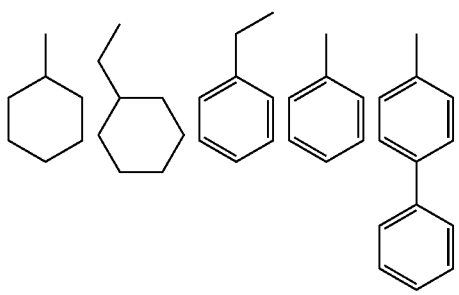

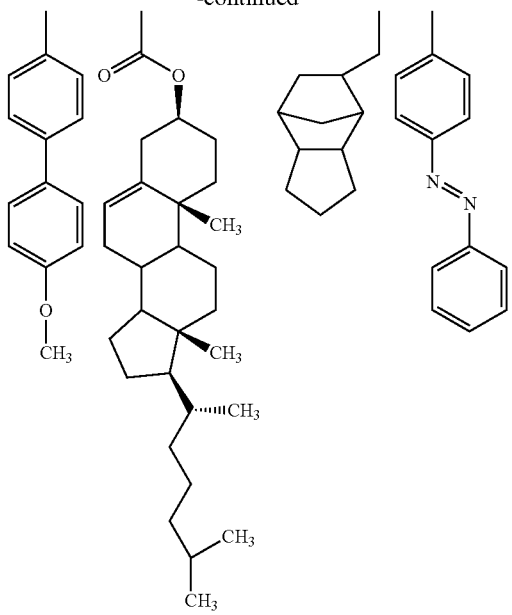

(iv) a group containing a hydrocarbon group substituted by one or more (preferably 1 or 2) carboxy groups
For example:

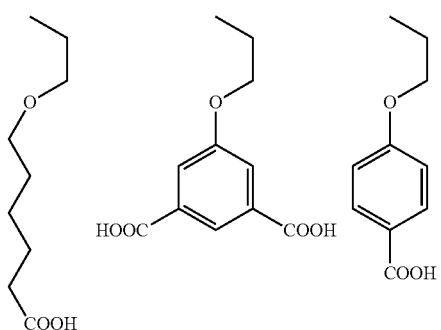

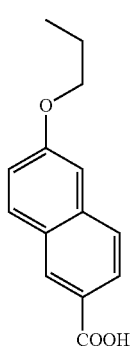

(v) a group containing one or more (preferably 1) amino groups
(vi) a hydrogen atom
(vii) a group containing an imidazolium salt For example:

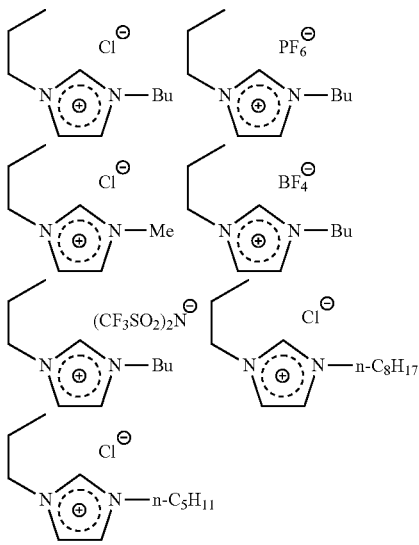

$R^{4g}$ is more preferably a hydrogen atom or an alkyl group which may be fluorinated and linked via an ethylene chain or an oxyethylene chain, more preferably, a hydrogen atom, a methoxyethyl group, an isobutyl group, or $R^{3i}$—$CF_2$—$(CF_2)_{s6}$—$(CH_2)_{s7}$—O—$(CH_2)_2$— ($R^{4i}$ is a fluorine atom or a hydrogen atom, s6 is an integer of 0-6, and s7 is an integer of 1-6), further preferably, a 3-(perfluoroethyl)propoxyethyl group (rational formula: $CF_3$—$(CF_2)$—$(CH_2)_3$—O—$(CH_2)_2$—).

In the above $R^4$, a structural unit $R^{4a}$ and a structural unit $R^{4b}$ may form a block unit, respectively, or may be randomly linked.

In the formulae (A) and (B), $R^5$ is each independently at each occurrence —O—, —S—, —NH— or a single bond. $R^5$ is preferably is —O—.

In the formulae (A) and (B), $R^6$ represents each independently at each occurrence a 2- to 7-valent organic group. In a compound of the formulae (A) and (B), $R^6$ is recognized to be a portion of a linker connecting between an $R^4$ part having curable moiety and a siloxane part. Therefore, the $R^4$ group may be any 2- to 7-valent organic group as long as the compound of the formulae (A) and (B) can stably exist. In addition, depending on the valence of the $R^4$ group, β in the formula becomes an integer of 1-6, for example, when $R^2$ is a divalent organic group, β is 1, and when $R^2$ is a 7-valent organic group, β is 6.

In a preferably embodiment, $R^6$ is a 2- to 4-valent organic group and β is 1-3, more preferably, $R^6$ is a divalent organic group and β is 1.

In more preferably embodiment, $R^6$ is —$(CH_2)_{r''}$— wherein r" is an integer of 1 or more and 20 or less, more preferably, —$(CH_2)_{r'''}$— wherein r'" is an integer of 1 or more and 10 or less, for example, a methylene group, an ethylene group, a propylene group.

In other preferable embodiment, $R^6$ may be the group of the formula (V) described for $R^2$.

Other examples of the $R^6$ include, for example the following groups:

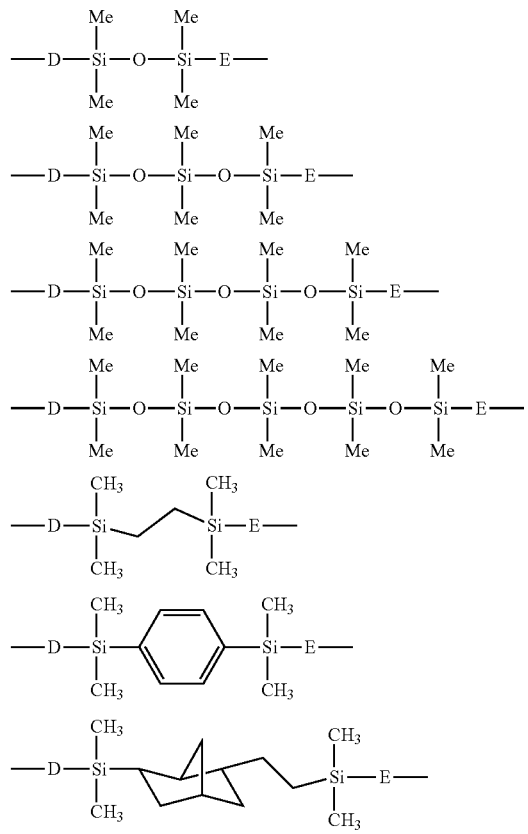

wherein D a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$— wherein Ph represents a phenyl group, and

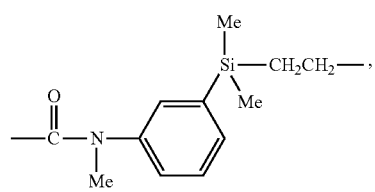

E is —$(CH_2)_n$— wherein n is an integer of 2-6, and

D is attached to $R^5$ of a main molecular chain of the formula (A) or the formula (B), and E is attached to a Si atom of the main molecular chain of the formula (A) or the formula (B).

Further other examples of $R^6$ include the following groups:

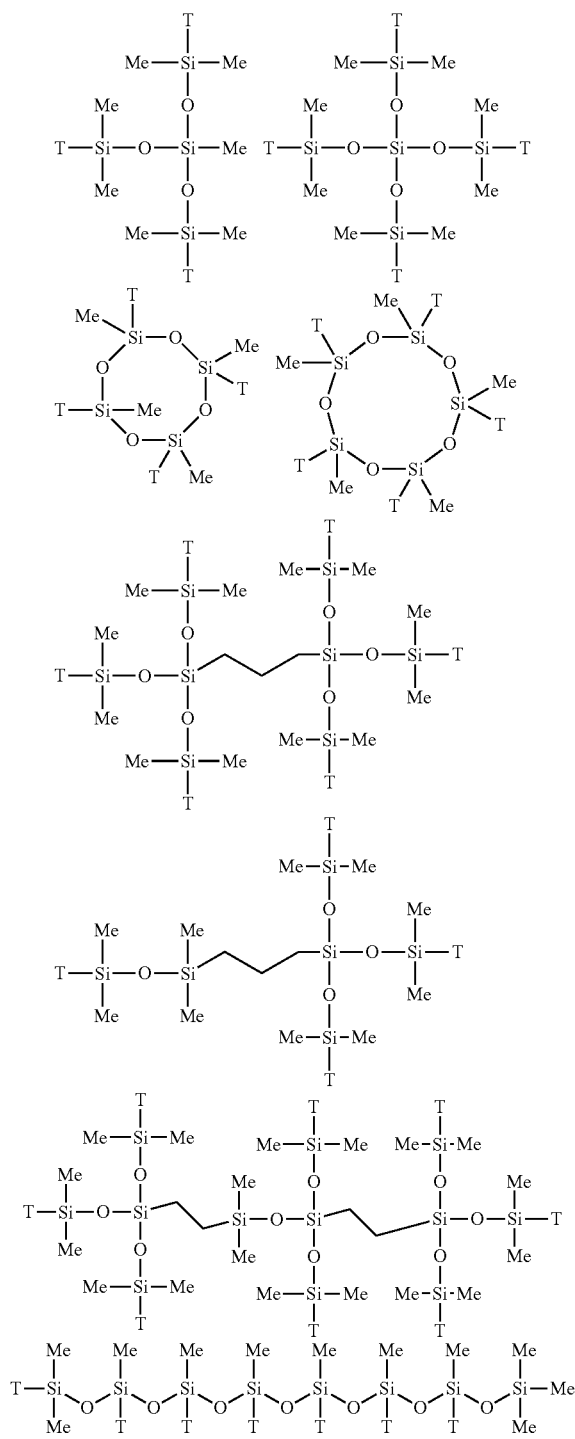

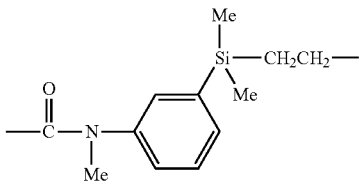

—CON(Ph)-(CH$_2$)$_3$— wherein Ph represents a phenyl group, or wherein any one of T is a following group attached to R$^5$ of the main molecular chain of the formula (A) or the formula (B):
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—, at least one of other T is —(CH$_2$)$_n$— wherein n is an integer of 2-6 which is attached to a Si atom of the main molecular chain of the formula (A) or the formula (B), if present, the other T are each independently a methyl group or a phenyl group.

The above R$^6$ group may be substituted by one or more substituents selected from a fluorine atom, a C$_{1-3}$ alkyl group and a C$_{1-3}$ fluoroalkyl group (preferably, a C$_{1-3}$ perfluoroalkyl group).

In a preferable embodiment, in the formulae (A) and (B), R$^2$ is a divalent organic group, R$^6$ is a divalent organic group, and α and β are 1.

In the formulae (A) and (B), R$^7$, R$^8$, R$^9$, R$^{10}$, R$^{11}$, R$^{12}$ and R$^{13}$ are each independently an alkyl group or an aryl group.

Examples of the alkyl group include, but are not particularly limited to, an alkyl group having 1-10 carbon atoms, and a cycloalkyl group having 3-20 carbon atoms, preferably an alkyl group having 1-6 carbon atoms, specifically, an n-butyl group for R$^{13}$, and a methyl group for R$^7$-R$^{12}$.

Examples of the aryl group include, but are not particularly limited to, an aryl group having 6-20 carbon atoms. The aryl group may contain 2 or more rings. Preferable aryl group is a phenyl group.

The alkyl group and the aryl group may optionally contain a heteroatom, for example, a nitrogen atom, an oxygen atom or a sulfur atom in its molecular chain or ring.

Furthermore, the alkyl group and the aryl group may optionally be substituted by one or more substituents selected from a halogen; a C$_{1-6}$ alkyl group, a C$_{2-6}$ alkenyl group, a C$_{2-6}$ alkynyl group, a C$_{3-10}$ cycloalkyl group, a C$_{3-10}$ unsaturated cycloalkyl group, a 5-10 membered heterocyclyl group, a 5-10 membered unsaturated heterocyclyl group, a C$_{6-10}$ aryl group, a 5-10 membered heteroaryl which may be substituted by one or more halogens.

In the formulae (A) and (B), n1 is an integer of 1-50, preferably an integer of 5-30.

In the formulae (A) and (B), n3 and n4 are each independently an integer of 0-50, and the sum of the n3 and n4 is 1 or more. Preferably, n3 and n4 are each independently an integer of 5-30.

In the formulae (A) and (B), n2, n5 and n6 are each independently an integer of 0-500. Preferably, n2, n5 and n6 are each independently an integer of 1-200, more preferably an integer of 10-200.

In one embodiment, the fluorine-containing and silicon-containing polymer of the formulae (A) and (B) are a fluorine-containing and silicon-containing polymer of the following formula (A1) or (B1), respectively (hereinafter, also referred to as a "fluorine-containing and silicon-containing polymer (A1)" and a "fluorine-containing and silicon-containing polymer (B1)", respectively):

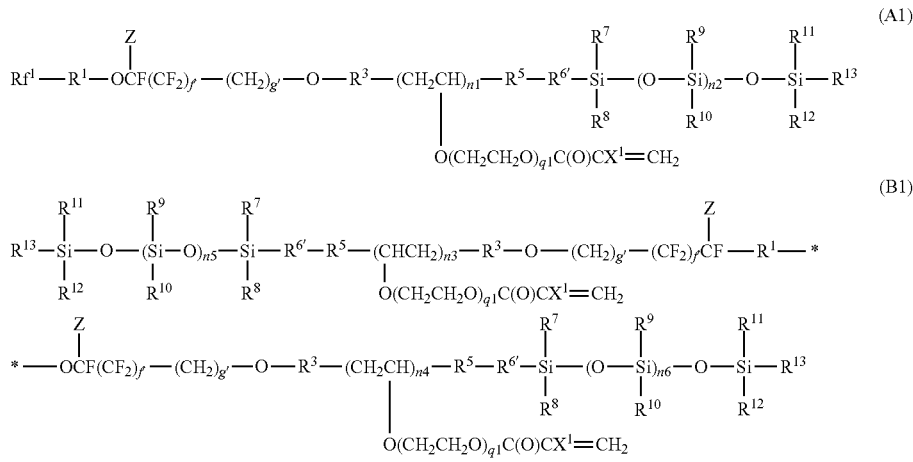

wherein:
Rf¹, R¹, R³, R⁵, R⁷, R⁸, R⁹, R¹⁰, R¹¹, R¹², R¹³, Z, n1, n2, n3, n4, n5 and n6 are as defined in the formulae (A) and (B) described above;
R⁶' is a divalent organic group corresponding to R⁶ in the formula (A) and (B);
X¹ is a hydrogen atom, a chlorine atom, a fluorine atom, or an alkyl group having 1-10 carbon atoms which may be substituted by a fluorine atom;
f' is each independently at each occurrence 0 or 1;
g' is each independently at each occurrence 1 or 2; and
q1 is each independently at each occurrence an integer of 1-10.

In another embodiment, the fluorine-containing and silicon-containing polymer of the formula (A) described above is a fluorine-containing and silicon-containing polymer of the following formula (A2) (hereinafter, also referred to as a "fluorine-containing and silicon-containing polymer (A2)"):

molecular weight of about $2\times10^2$ to $1\times10^5$. Among such range, it is preferable to have the number average molecular weight of about $1\times10^3$ to $1\times10^5$ in view of high friction durability. On the other hand, the fluorine-containing and silicon-containing polymer (B) may have, but is not limited to, a number average molecular weight of about $2\times10^2$ to $1\times10^5$. Among such range, it is preferable to have the number average molecular weight of about $1\times10^3$ to $1\times10^5$ in view of high friction durability. The number average molecular weight can be measured by using a gel permeation chromatography (GPC).

Hereinafter, the process for producing a fluorine-containing and silicon-containing polymer (A) and (B) will be described.

The fluorine-containing and silicon-containing polymer of the general formulae (A) and (B) can be produced by a method comprising the following steps:

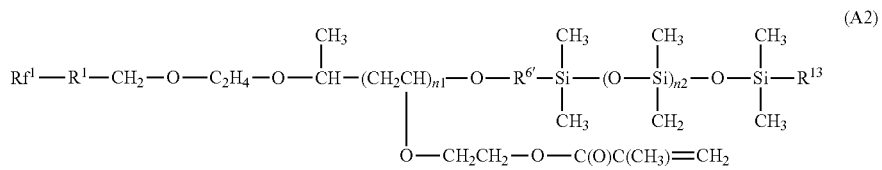

wherein:
Rf¹, R¹, R¹³, n1 and n2 are as defined in the formula (A); and
R⁶' is a divalent organic group corresponding to R⁶ in the formula (A).

In a preferable embodiment, in the formulae (A1), (A2) and (B1) described above, R¹ is —(OCF₂CF₂CF₂)_b— and b is an integer of 1-200.

In another preferable embodiment, in the formulae (A1), (A2) and (B1), R¹ is —(OCF₂CF₂CF₂CF₂)_a—(OCF₂CF₂CF₂)_b—(OCF₂CF₂)_c—(OCF₂)_d— wherein a and b are each independently an integer of 0-30, c and d are each independently an integer of 1-200, and the occurrence order of the respective repeating units in parentheses is not limited in the formula.

The fluorine-containing and silicon-containing polymer (A) may have, but is not limited to, a number average (1) cationic polymerizing a cationic polymerizable monomer in the presence of a perfluoropolyether group-containing cationic polymerization initiator and a Lewis acid (Step 1), and
(2) stopping the cationic polymerization reaction by using an alkanol group-containing polysiloxane (Step 2).

Hereinafter, for a compound of the formulae (A) and (B) wherein R² is a divalent organic group, R⁶ is a divalent organic group, and α and β are 1 as an example, the above process for producing will be described.

(I) Step 1
(I-i) Perfluoropolyether Group-Containing Cationic Polymerization Initiator
The "perfluoropolyether group-containing cationic polymerization initiator" (initiating species) used in Step is a cationic polymerization initiator containing a monovalent or divalent perfluoropolyether group.

Examples of the "cationic polymerization initiator containing a monovalent perfluoropolyether group" includes, for example,
(a) a compound of the formula:

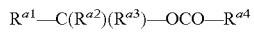

wherein $R^{a1}$ represents Rf—$R^1$—$R^2$—,
Rf, $R^1$ and $R^2$ are as described in the general formula (A),
$R^{a2}$ represents a hydrogen atom or an alkyl group,
$R^{a3}$ represents a hydrogen atom or an alkyl group,
provided that at least one of $R^{a2}$ and $R^{a3}$ is an alkyl group, and
$R^{a4}$ represents an alkyl group or a perfluoroalkyl group,
or
(b) a compound of the formula:

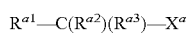

wherein $R^{a1}$ represents Rf—$R^1$—$R^2$—,
Rf, $R^1$ and $R^2$ are as described in the general formula (A),
$R^{a2}$ represents a hydrogen atom or an alkyl group,
$R^{a3}$ represents a hydrogen atom or an alkyl group,
provided that at least one of $R^{a2}$ and $R^{a3}$ is an alkyl group, and
$X^a$ represents a halogen atom.

Examples of the "cationic polymerization initiator containing a divalent perfluoropolyether group" includes, for example,
(c) a compound of the formula:

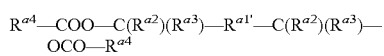

wherein $R^{a1'}$ represents —$R^2$—$R^1$—$R^2$—,
$R^1$ and $R^2$ are as described in the general formula (B),
$R^{a2}$ represents a hydrogen atom or an alkyl group,
$R^{a3}$ represents a hydrogen atom or an alkyl group,
provided that at least one of $R^{a2}$ and $R^{a3}$ is an alkyl group, and
$R^{a4}$ represents an alkyl group or a monovalent perfluoroalkyl group,
or
(d) a compound of the formula:

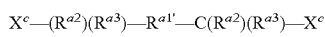

wherein $R^{a1'}$ represents —$R^2$—$R^1$—$R^2$—,
$R^1$ and $R^2$ are as described in the general formula (B),
$R^{a2}$ represents a hydrogen atom or an alkyl group,
$R^{a3}$ represents a hydrogen atom or an alkyl group,
provided that at least one of $R^{a2}$ and $R^{a3}$ is an alkyl group, and
$X^c$ represents a halogen atom.

When "the perfluoropolyether group-containing cationic polymerization initiator" is the cationic polymerization initiator containing a monovalent perfluoropolyether group, the compound can be produced by the reaction of a compound of the formula:

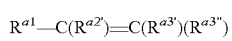

wherein:
$R^{a1}$ is as defined above,
$R^{a2'}$ represents a hydrogen atom or an alkyl group, preferably a hydrogen atom, and
$R^{a3'}$ and $R^{a3''}$ represents each independently a hydrogen atom or an alkyl group, preferably a hydrogen atom, with an organic carboxylic acid (preferably carboxylic acid, trifluoroacetic acid, more preferably trifluoroacetic acid) or hydrogen halide.

For example, a compound of the formula:

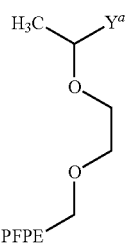

(Ia)

wherein PFPE represents a perfluoropolyether group, and
$Y^a$ represents an acyloxy group (e.g. $CF_3COO$), or a halogen atom,
can be produced by a method comprising a step of the reaction of a vinyl ether compound "a" of the formula:

wherein PFPE is as defined above,
with a compound of the formula:

$Y^a$—H wherein $Y^a$ is as defined above (preferably, $CF_3COOH$).

On the other hand, when "the perfluoropolyether group-containing cationic polymerization initiator" is the cationic polymerization initiator containing a divalent perfluoropolyether group, the compound can be produced by the reaction of a compound of the formula:

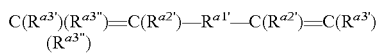

wherein $R^{a1'}$, $R^{a2'}$, $R^{a3'}$ and $R^{a3''}$ are as defined above, with an organic carboxylic acid (preferably acetic acid, trifluoroacetic acid ($CF_3COOH$), more preferably trifluoroacetic acid) or hydrogen halide.

For example, a compound of the formula:

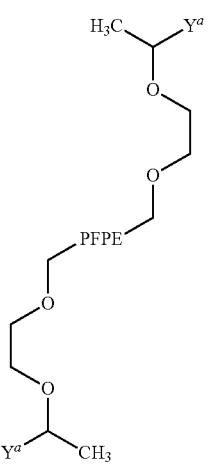

(Ib)

wherein PFPE represents a divalent perfluoropolyether group, and
$Y^a$ represents an acyloxy group (e.g. $CF_3COO$), or a halogen atom,
can be produced by a method comprising a step of reacting a vinyl ether compound b of the formula:

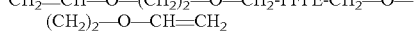

wherein PFPE is as defined above,
with a compound of the formula:

wherein $Y^a$ is as defined above (preferably, $CF_3COOH$).

It is preferable that the reaction is carried out in the presence of an acid in a solvent that does not adversely affect the reaction.

The acid is preferably a mineral acid such as hydrochloric acid. An amount used of the acid is usually 0.01-1,000 moles with respect to 1 mole of the vinyl ether compound a or the vinyl ether compound b.

The solvent is preferably a fluorine-containing solvent such as 1,1-dichloro-1,2,2,3,3-pentafluoropropane (hereinafter, also referred to as HCFC-225), hydrofluoroethers (hereinafter, also referred to as HFE), aliphatic perfluorohydrocarbons having 5-12 carbon atoms, aliphatic polyfluorohydrocarbons and 1,3-bistrifluoromethylbenzene A reaction temperature is usually −78 to 50° C., preferably −10 to 10° C.

A reaction time is usually from 1 minute to 60 minutes.

The monovalent perfluoropolyether group-containing cationic polymerization initiator corresponds to a moiety of the formula:

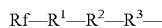

in the fluorine-containing polymer (A).

The divalent perfluoropolyether group-containing cationic polymerization initiator corresponds to a moiety of the formula:

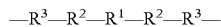

in the fluorine-containing polymer (B).

(I-ii) Cationic Polymerizable Monomer

The cationic polymerizable monomer used in Step 1 corresponds to $R^4$, that is, $R^{4a}$ or $R^{4b}$ in the general formulae (A) and (B).

For example, when a fluorine-containing and silicon-containing polymer of the general formula (A) and (B) wherein a structural unit $R^{4a}$ of $R^4$ is a group of formula:

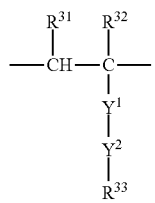

wherein:
$R^{31}$ is a hydrogen atom or an alkyl group, preferably a hydrogen atom;
$R^{32}$ is a hydrogen atom or an alkyl group, preferably a methyl group or a hydrogen atom, more preferably, a hydrogen atom;
$R^{33}$ is an organic group having a curable moiety;
$Y^1$ is —O—, —N($R^c$)—, phenylene or carbazolylene wherein $R^c$ is an organic group, preferably an alkyl group; and
$Y^2$ is a linker wherein the number of atoms of the main backbone is 1-16 (more preferably 2-12, further preferably 2-10), is produced, a compound of the formula (4a):

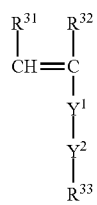

wherein $R^{31}$, $R^{32}$, $R^{33}$, $Y^1$ and $Y^2$ are as defined above, is used as a cation polymerizable monomer.

Preferable examples of a monomer corresponding to the structural unit $R^{4a}$ include the following compounds having a (meth)acryloyl group as the curable moiety.

(i) a vinyl ether compound the formula: $CH_2=CH—O—(CHR^{b1}—O)_t—C(O)CX^1=CH_2$
wherein t is an integer of 1-10, preferably an integer of 1-5,
$R^{b1}$ represents a hydrogen atom or methyl group, preferably a hydrogen atom, and
$X^1$ is as defined in the general formulae (A1) and (B1).

(ii) a vinyl ether compound the formula: $CH_2=CH—O—(CHR^{b2})_{t'}—OC(O)CX^1=CH_2$
wherein t' is a repeating number of an integer of 1-40, preferably an integer of 1-10,
$R^{b2}$ represents a hydrogen atom or a methyl group, and
$X^1$ is as defined in the general formulae (A1) and (A2).

For example, when $R^4$ in the general formulae (A) and (B) contains the structural unit $R^{4b}$, a compound of the following formula:

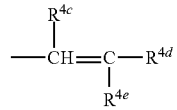

wherein $R^{4c}$, $R^{4d}$ and $R^{4e}$ are as defined above is used as the cationic polymerizing monomer.

Preferable examples of a monomer corresponding to the structural unit $R^{4b}$ include the following compounds having no curable moiety.

A compound of the formula (4b):

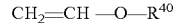

wherein
$R^{40}$ represents a monovalent organic group, provided that the monovalent organic group does not contain a —OH group, a —COOH group and a —NH$_2$ group.

Examples of the compounds include the following compounds.

(i) a vinyl ether compound of the formula:

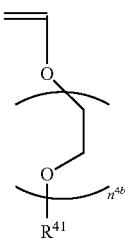

wherein $n^{4b}$ represents an integer of 1-10, and $R^{41}$ represents an alkyl group.

Specific examples of the vinyl ether compound:

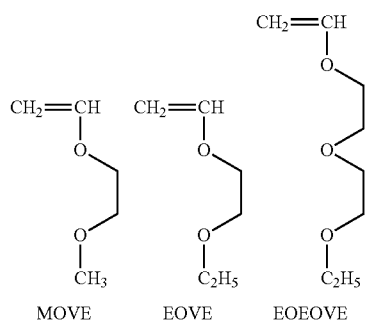

MOVE  EOVE  EOEOVE (ii) a vinyl ether compound of the formula:

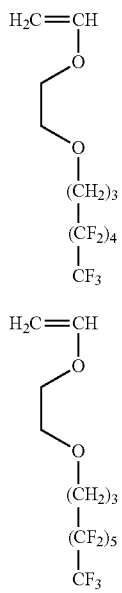

wherein $n^{4b}$ represents an integer of 1-10, and $R^{42}$ represents an alkyl group substituted by one or more fluorine atoms.

Specific examples of the vinyl ether compound:

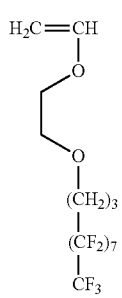 5FVE

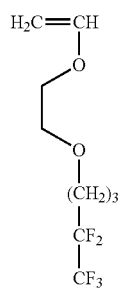 9FVE

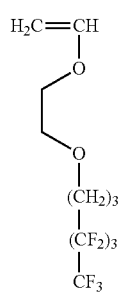 11FVE

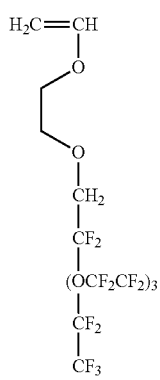 13FVE

17FVE

19FVE

21FVE

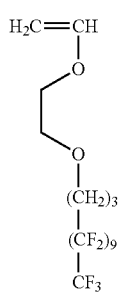

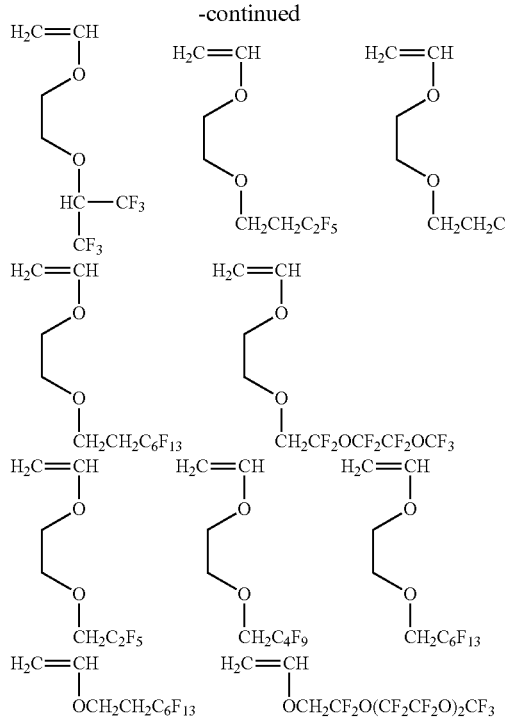

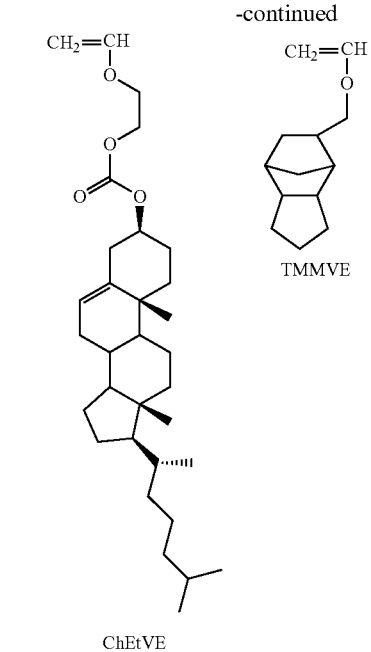

(iii) a vinyl ether compound containing at least one cyclic moiety selected from the group consisting of a monocyclic carbocyclic ring, a bicyclic carbocyclic ring, a tricyclic carbocyclic ring, and a tetracyclic carbocyclic ring.

Specific examples of the vinyl ether compound:

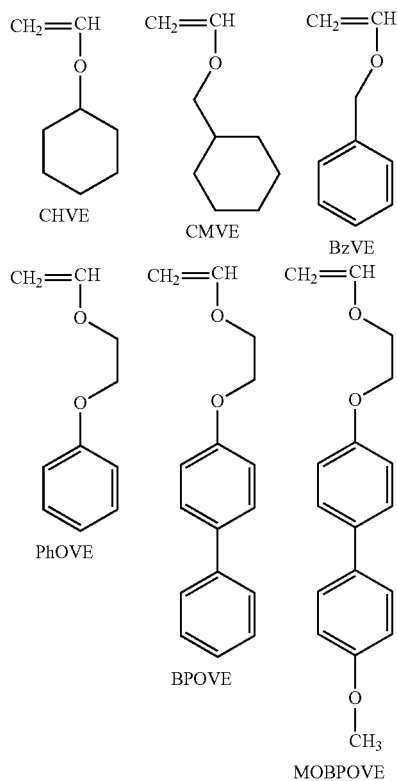

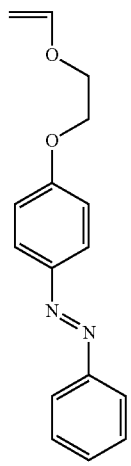

(iv) a vinyl ether compound of the formula:

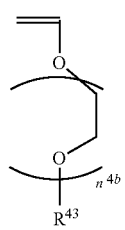

wherein $n^{4b}$ represents an integer of 1-10, and $R^{43}$ represents a hydrocarbon group substituted by one or more (preferably 1 or 2) alkoxycarbonyl groups.

Specific examples of the vinyl ether compound:

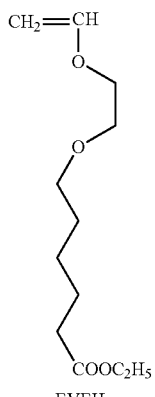
EVEH

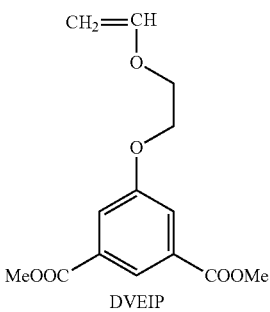
DVEIP

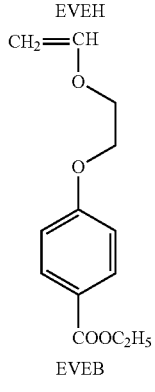
EVEB

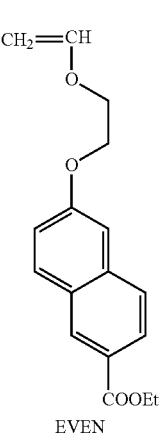
EVEN

When the vinyl ether compound is used, a carboxyl group can be introduced into the fluorine containing copolymer of the present invention by hydrolysis of the alkoxycarbonyl group after polymerization, if desired.

(v) a vinyl ether compound containing one or more (preferably 1) amino groups protected by imidization or amidation Specific examples of the vinyl ether compound:

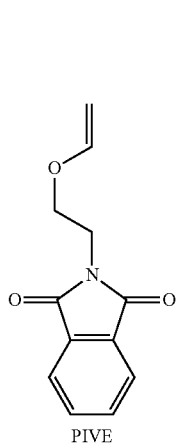
PIVE

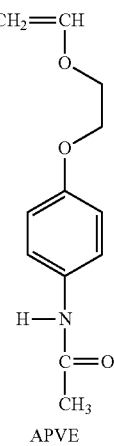
APVE

When the vinyl ether compound is used, an amino group can be introduced into the fluorine containing copolymer of the present invention by deprotection of the protected amino group after polymerization, if desired.

(vi) a vinyl ether compound containing one or more (preferably 1) protected hydroxyl groups Specific examples of the vinyl ether compound:

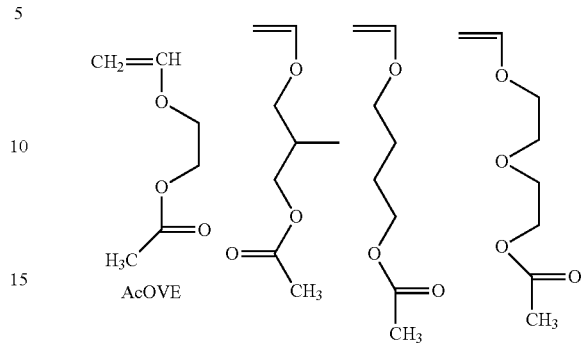
AcOVE

When the vinyl ether compound is used, a hydroxyl group can be introduced into the fluorine containing copolymer of the present invention by deprotection of the protected hydroxyl group after polymerization, if desired.

(vii) a vinyl ether compound containing an imidazolium salt

Specific examples of the vinyl ether compound:

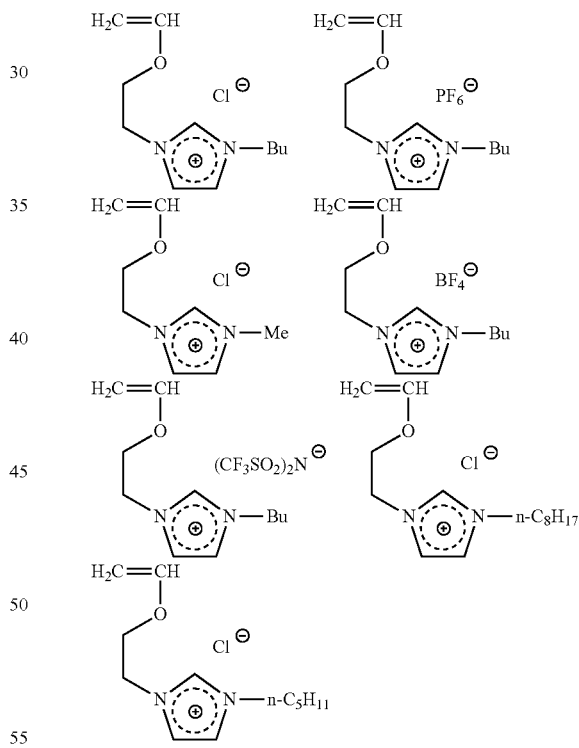

When a polymer wherein $R^4$ consists only of the structural unit $R^{4a}$ is synthesized, a monomer corresponding to the structural unit $R^{4a}$, for example, the above-mentioned monomer of the formula (4) is used as the cationic polymerizable monomer.

When a copolymer wherein $R^4$ comprises the structural unit $R^{4b}$ in addition to the structural unit $R^{4a}$ is synthesized, a monomer corresponding to the structural unit $R^{4b}$, for example, the above-mentioned monomer of the formula (4b) is used in addition to the monomer corresponding to the structural unit $^{R4a}$ as the cationic polymerizable monomer.

When a copolymer wherein each of the structural units $R^{4a}$ and $R^{4b}$ forms a block in $R^4$ is synthesized, the monomer corresponding to the structural unit $R^{4a}$ and the monomer corresponding to the structural unit $R^{4b}$ are sequentially cationic polymerized.

Specifically, only the first cationic polymerizable monomer (the monomer corresponding to the structural unit $R^{4a}$ or the monomer corresponding to the structural unit $R^{4b}$) is added to a reaction system to initiate polymerization. After the polymerization is complete, the second cationic polymerizable monomer (the monomer corresponding to the structural unit $R^{4b}$ or the monomer corresponding to the structural unit $R^{4a}$) is added to the reaction solution to proceed the polymerization of the second cationic polymerizable monomer since a cation is always present at the terminal of the polymer in the progress of a living cationic polymerization.

On the other hand, when a copolymer wherein the structural units $R^{4a}$ and $R^{4b}$ randomly are bonded in $R^4$ is synthesized as the fluorine-containing and silicon-containing polymer, both the monomer corresponding to the structural unit $R^{4a}$ and the monomer corresponding to the structural unit $R^{4b}$ are added to the reaction system to initiate a polymerization reaction.

The cationic polymerizable monomers are commercially available or can be produced by a known method.

An amount used of the cationic polymerizable monomer is appropriately determined depending on a structure of a fluorine-containing polymer of interest.

In the process for producing, since the living cationic polymerization is used, the repeating number of the structural units derived from the cationic polymerizable monomer can highly be controlled.

In the process for producing, since the living cationic polymerization is used, the repeating number of the structural units derived from the cationic polymerizable monomer can highly be controlled.

(I-iii) Lewis acid

Examples the Lewis acid used in Step 1 include, for example, a compound of the formula (L1) described below and a compound of the formula (L2) described below.

Aluminum compound of the formula:

$$AlY^aY^bY^c \quad \text{(L1)}$$

wherein $Y^a$, $Y^b$ and $Y^c$ represent each independently a halogen atom, an alkyl group, an aryl group, an alkoxy group or an aryloxy group.

Examples of the "halogen atom" represented by $Y^a$, $Y^b$ and $Y^c$ include, for example, chlorine, bromine, iodine and the like.

Examples of the "alkyl group" represented by $Y^a$, $Y^b$ and $Y^c$ include, for example, an alkyl group having 1-10 carbon atoms.

Examples of the "aryl group" represented by $Y^a$, $Y^b$ and $Y^c$ include, for example, an aryl group having 6-10 carbon atoms.

Examples of the "alkoxy group" represented by $Y^a$, $Y^b$ and $Y^c$ include, for example, an alkoxy group having 1-10 carbon atoms.

Examples of the "aryloxy group" represented by $Y^a$, $Y^b$ and $Y^c$ include, for example, an aryloxy group having 6-10 carbon atoms.

Specific examples of the aluminum compound of the formula (L1) include, for example:

organic aluminum halide compounds such as diethyl aluminum chloride, diethyl aluminum bromide, diethyl aluminum fluoride, diethyl aluminum iodide, diisopropyl aluminum chloride, diisopropyl aluminum bromide, diisopropyl aluminum fluoride, diisopropyl aluminum iodide, dimethyl aluminum sesquichloride, methyl aluminum chloride, ethyl aluminum dichloride, ethyl aluminum dibromide, ethyl aluminum difluoride, ethyl aluminum diiodide, isobutyl aluminum dichloride, octyl aluminum dichloride, ethoxy aluminum dichloride, vinyl aluminum dichloride, phenyl aluminum dichloride, ethyl aluminum sesquichloride, ethyl aluminum sesquibromide, aluminum trichloride, aluminum tribromide, ethylaluminum ethoxy chloride, butyl aluminum butoxy chloride, ethyl aluminum ethoxy bromide; dialkoxyalkyl aluminums such as diethoxyethyl aluminum; and bis(alkyl-substituted aryloxy) alkyl aluminums such as bis(2,6-di-t-butyl-phenoxy)methyl aluminum, bis(2,4,6-tri-t-butylphenoxy)methyl aluminum, and the like.

These aluminum compounds may be used alone or may be used in combination of two or more.

Tetravalent titanium or tetravalent tin compound of the formula:

$$MZ^aZ^bZ^cZ^d \quad \text{(L2)}$$

wherein M represents tetravalent Ti or Sn, and $Z^a$, $Z^b$, $Z^c$ and $Z^d$ represent, each independently, a halogen atom, an alkyl group, an aryl group, an alkoxy group or an aryloxy group.

Examples of the "halogen atom", the "alkyl group", the "aryl group", the "alkoxy group" and the "aryloxy group" represented by $Z^a$, $Z^b$, $Z^c$ and $Z^d$ include one exemplified for $Y^a$, $Y^b$ and $Y^c$.

Specific examples of the tetravalent titanium compound of the formula (L2) include, for example:
titanium tetrahalides such as titanium tetrachloride, titanium tetrabromide, and titanium iodide;
halogenated titanium alkoxides such as titanium triethoxysilane chloride, and titanium tri-n-butoxide; and titanium alkoxides such as titanium tetraethoxide and titanium n-butoxide.

Specific examples of the tetravalent tin compound of the formula (L2) include, for example:
tin tetrahalides such as tin tetrachloride, tin tetrabromide, and tin iodide.

These tetravalent titanium and tetravalent tin compounds may be used alone or may be used in combination of two or more.

Examples of the Lewis acid further include halides of iron (Fe), gallium (Ga), indium (In), zinc (Zn), zirconium (Zr), hafnium (Hf), bismuth (Bi), silicon (Si), germanium (Ge), or antimony (Sb); onium salts (e.g. an ammonium salt, a phosphonium salt); and metal oxides (e.g. $Fe_2O_3$, $Fe_3O_4$, $In_2O_3$, $Ga_2O_3$, ZnO, and $Co_3O_4$, etc.).

An amount used of the Lewis acid is preferably an amount such that a cationic polymerizable monomer/a Lewis acid (molar ratio) is about 2-1,000, more preferably about 10-1,000.

(I-iv) Growing Species-stabilizing Agent

In Step 1, in order to stabilize a growing species in the living cationic polymerization, an oxygen or nitrogen containing compound may be used.

The growing species means an activated species (cation) present at the end of a polymer which is growing.

Examples of the oxygen or nitrogen containing compound include, for example, esters, ethers, ketones, imides, phosphoric acid compounds, pyridine derivatives, and amines. Specifically, examples of the ester include, for example, ethyl acetate, butyl acetate, phenyl acetate, methyl chloroacetate, methyl dichloroacetate, ethyl butyrate, ethyl stearate, ethyl benzoate, phenyl benzoate, diethyl phthalate, and diethyl isophthalate.

Examples of the ether include, for example, chain ethers such as diethyl ether and ethylene glycol; and cyclic ethers such as dioxane and tetrahydrofuran.

Examples of the ketone include, for example, acetone and methyl ethyl ketone.

Examples of the imide include, for example, ethyl phthalimide.

Examples of the phosphoric acid compound include, for example, triethyl phosphate.

Examples of the pyridine derivative include, for example, 2,6-dimethyl pyridine.

Examples of the amine include, for example, tributylamine.

These compounds may be used alone or may be used in combination of two or more.

An amount used of the oxygen or nitrogen containing compound is preferably about 0.1-2,000 moles, more preferably about 1-2,000 moles with respect to 1 mole of a Lewis acid.

The reaction may be carried out in bulk, but preferably a solvent is used.

Examples of the solvent include, for example, aliphatic hydrocarbons such as n-pentane, n-hexane and cyclohexane; aromatic hydrocarbons such as benzene, toluene and xylene; halogenated hydrocarbons such as carbon tetrachloride, methylene chloride, and dichloroethane; ethers such as dimethyl ether. In particular, a non-polar solvent is preferable. These solvents may be used alone or may be used in combination of two or more.

With respect to an amount used of the solvent, usually the solvent: the vinyl compound (volume ratio) is 1:1 to 100:1, preferably 5:1 to 30:1.

A reaction temperature is usually −80° C. to 150° C., preferably −78 to 80° C.

A reaction time is usually 1 minute to 480 minutes, preferably 1 minute to 360 minutes.

(II) Step 2

(II-i) Cationic Polymerization Terminator

The "cationic polymerization terminator" used in Step 2 is a polysiloxane compound of the formula:

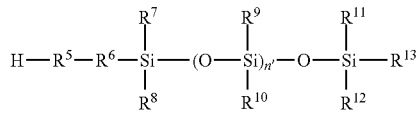

wherein:

$R^5$, $R^6$, $R^7$, $R^8$, $R^9$, $R^{10}$, $R^{11}$, $R^{12}$ and $R^{13}$ as defined in the general formulae (A) and (B); and n' is an integer of 0-500.

Preferably, the cationic polymerization terminator is an alkanol group-containing polysiloxane compound of the following formula:

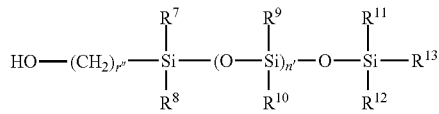

wherein $R^7$, $R^8$, $R^9$, $R^{10}$, $R^{11}$, $R^{12}$, $R^{13}$ and n' are as defined in the general formulae (A) and (B); and r" is 1 or more and 20 or less.

The alkanol group-containing polysiloxane compound preferably has an average molecular weight of 100-20,000.

The polysiloxane compound is commercially available or can be produced by a known method. Examples of the commercially available polysiloxane compound include SILAPLANE FM-021 and SILAPLANE FM-025 (both are manufactured by JNC Corporation).

An amount used of the alkanol group-containing polysiloxane compound is 1-10 mol, more preferably 1-3 mol per 1 mol of the initiator.

The reaction temperature in Step 2 is usually −80° C. to 150° C., preferably −78° C. to 80° C. The reaction time is usually 1 minute to 360 minutes, preferably 30 minutes to 120 minutes.

(III) Other Steps

The fluorine-containing polymer of the general formulae (A) and (B) thus obtained can be purified by using a conventional method, if necessary.

The fluorine-containing polymer of the general formulae (A1 and (B) produced by such process for producing has a high uniformity of the molecular weight. For example, a dispersity (weight average molecular weight/number average molecular weight) is within a range of about 2.5-1.0.

Next, a surface treatment agent comprising the fluorine-containing and silicon-containing polymer of the general formulae (A) and (B) will be described.

The fluorine-containing and silicon-containing polymer of the present invention is preferably used for treating a surface of a base material formed of various materials comprising a resin. That is, the present invention provides a surface treatment agent comprising one or more fluorine-containing and silicon-containing polymers of the formulae (A) and (B).

The surface treatment agent of the present invention may further comprise at least one fluorine-containing oil of the following general formula (C) (hereinafter, also referred to as a "fluorine-containing oil (C)").

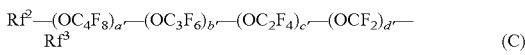

In the formula (C), $Rf^2$ represents an alkyl group having 1-16 carbon atoms which may be substituted by one or more fluorine atoms, and $Rf^3$ represents a hydrogen atom, a fluorine atom or an alkyl group having 1-16 carbon atoms which may be substituted by one or more fluorine atoms. Preferably, $Rf^2$ and $Rf^3$ are each independently an alkyl having 1-3 carbon atoms which may be substituted by one or more fluorine atoms, more preferably a perfluoroalkyl group having 1-3 carbon atoms.

In the formula (C), a', b', c' and d' represent the repeating number of each of four repeating units of perfluoropolyether which constitute a main backbone of the polymer, and are each independently an integer of 0 or more and 300 or less, preferably an integer of 0 or more and 200 or less and the sum of a', b', c' and d' is at least 1, preferably 1-300. The occurrence order of the respective repeating units in parentheses with the subscript a', b', c' or d' is not limited in the formulae. Among these repeating units, the —(OC$_4$F$_8$)— group may be any of —(OCF$_2$CF$_2$CF$_2$CF$_2$)—, —(OCF(CF$_3$)CF$_2$CF$_2$)—(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, preferably —(OCF$_2$CF$_2$CF$_2$CF$_2$). The —(OC$_3$F$_6$)— group may be any of —(OCF$_2$CF$_2$CF$_2$)—, —(OCF(CF$_3$)CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

Examples of the fluorine-containing oil of the above general formula (C) include a compound of any of the following general formulae (C1) and (C2) (which may be one compound or a mixture of two or more compounds):

  (C1)

wherein Rf$^2$ and Rf$^3$ are as defined above, b" is an integer of 0-300, and the occurrence order of the respective repeating units in parentheses with the subscript b" is not limited in the formula;

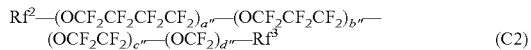  (C2)

wherein Rf$^2$ and Rf$^3$ are as defined above, a" and b" are each independently an integer of 0-30, c" and d" are each independently 0-300, and the occurrence order of the respective repeating units in parentheses with the subscript a", b", c" and d" is not limited in the formula.

The fluorine-containing oil (C) may have an average molecular weight of about 1,000-30,000. Thereby, high surface slip property can be obtained.

The fluorine-containing oil (C) may be contained in the surface treatment agent of the present invention, for example, at 0-80 parts by mass, preferably 0-40 parts by mass with respect to total 100 parts by mass of the fluorine-containing and silicon-containing polymer (A) and (B) (as the total mass when two or more compounds are used; hereinafter the same shall apply).

The fluorine-containing oil (C) may be contained in the surface treatment agent of the present invention, preferably at 40% by mass with respect to the total mass of the fluorine-containing and silicon-containing polymer (A) and (B) and the fluorine-containing oil (C).

The fluorine-containing oil (C) contributes to increasing of surface slip property of the surface-treating layer.

The surface treatment agent of the present invention may contain other components, for example, a silicone oil, an active energy curing initiator, and the like in addition to the above component.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface treatment agent of the present invention, for example, at 0-50 parts by mass, preferably 0-10 parts by mass with respect to 100 parts by mass of the fluorine-containing and silicon-containing polymer (A) and (B) (as the total mass when two or more compounds are used; hereinafter the same shall apply).

As the active energy curing initiator, for example, a compound is used which generates a radical or cation only by irradiation of an electromagnetic wave of 350 nm or less, that is, an ultraviolet light, an electron beam, an X-ray, a γ-ray, etc., and functions as a catalyst initiating curing (cross-linking reaction) of a curable moiety (for example, carbon-carbon double bond) in a fluorine-containing and silicon-containing polymer having a curable moiety, usually a compound which generates a radical or cation, in particular a radical by irradiation of ultraviolet.

The active energy curing initiator in the surface treatment agent of the present invention can be appropriately selected depending on a type of the curable moiety (radical reactive or cation reactive) of the fluorine-containing and silicon-containing polymer (A) and (B), a type or irradiation intensity of an active energy ray used (range of wavelength, etc.). Examples of the initiator which cures the fluorine-containing and silicon-containing polymer (A) and (B) having the radical reactive curable moiety (carbon-carbon double bond) by using the active energy ray in ultraviolet range include, for example, the following compounds.

Acetophenones acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins benzoin, benzoin methyl ether, benzoin ethyl ether, benzoin isopropyl ether, benzoin isobutyl ether, benzyl dimethyl ketal, and the like.

Benzophenones benzophenone, benzoyl benzoate, methyl benzoyl benzoate, 4-phenyl benzophenone, hydroxy benzophenone, hydroxy-propyl benzophenone, acrylated benzophenone, Michler's ketone, and the like.

Thioxanthones thioxanthone, chlorothioxanthone, methylthioxanthone, diethylthioxanthone, dimethylthioxanthone, and the like.

Others benzyl, α-acyloxime ester, acylphosphine oxide, glyoxy ester, 3-ketocoumarin, 2-ethylanthraquinone, camphorquinone, anthraquinone, and the like.

These active energy curing initiators may be used alone or may be used in combination of two or more.

The active energy curing initiator is contained at 0.01-30 parts by mass, preferably 0.1-20 parts by mass with respect to the total 100 parts by mass of the fluorine-containing and silicon-containing polymer (A) and (B), and if present, the fluorine-containing oil (C), but are not particularly limited thereto.

The surface treatment agent of the present invention may contain a solvent. The fluorine-containing and silicon-containing polymer (A) and (B) contained in the surface treatment agent of the present invention has high solubility in not only a fluorine-containing organic solvent but also a fluorine-free organic solvent which is a general-purpose solvent, therefore, as the above solvent, the fluorine-containing organic solvent and the fluorine-free organic solvent can be used.

Examples of the fluorine-containing organic solvent include, for example, perfluorohexane, perfluorooctane, perfluoro-dimethyl cyclohexane, perfluorodecalin, perfluoroalkyl ethanol, perfluorobenzene, perfluorotoluene, perfluoroalkylamines (Fluorinert (trade name), etc.), perfluoroalkyl ethers, perfluorobutyl tetrahydrofuran, polyfluoro-aliphatic hydrocarbons (ASAHIKLIN AC6000 (trade name)), hydrochlorofluorocarbons (ASAHIKLIN AK-225 (trade name), etc.), hydrofluoroethers (Novec (trade name), HFE-7100 (trade name), etc.), 1,1,2,2,3,3,4-heptafluorocyclopentane, fluorine-containing alcohols, perfluoroalkyl bromide, perfluoroalkyl iodide, perfluoropolyether (Krytox (trade name), Demnum (trade name), Fomblin (trade name), etc.), 1,3-bistrifluoromethyl benzene, 2-(perfluoroalkyl)ethyl methacrylate, 2-(perfluoroalkyl)ethyl acrylate, perfluoroalkyl ethylene, Freon 134a, and hexafluoropropene oligomers.

Examples of the fluorine-free organic solvent include, for example, acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, 2-butanone, acetonitrile, benzonitrile, butanol, 1-propanol, 2-propanol, ethanol, methanol, and diacetone alcohol.

Among them, the solvent used in the surface treatment agent of the present invention is preferably, methyl isobutyl ketone, propylene glycol monomethyl ether, hexadecane, butyl acetate, acetone, 2-butanone, cyclohexanone, ethyl acetate, diacetone alcohol or 2-propanol.

These solvents may be used alone or may be used in combination of two or more.

The solvent is contained at 5-10,000 parts by mass, preferably 5-5,000 parts by mass with respect to the total 100 parts by mass of the fluorine-containing and silicon-containing polymer (A) and (B), and if present, the fluorine-containing oil (C).

In one embodiment, the surface treatment agent of the present invention can be added to a matrix forming composition to provide a curable composition.

The curable composition contains the fluorine-containing and silicon-containing polymer or the surface treatment agent of the present invention at 0.01-20% by mass, preferably 0.01-10% by mass, more preferably, 0.1-10% by mass.

The matrix forming composition means a composition containing a compound having at least one carbon-carbon double bond which is, but are not particularly limited to, for example, a monofunctional and/or polyfunctional acrylate and methacrylate (hereinafter, acrylate and methacrylate also generally referred to as "(meth)acrylate"), a monofunctional and/or polyfunctional urethane (meth)acrylate, a monofunctional and/or polyfunctional epoxy (meth)acrylate. Examples of the matrix forming composition include, but are not particularly limited to, a composition which is generally a hard coating agent or an antireflection agent, for example, a hard coating agent containing the polyfunctional (meth)acrylate or an antireflection agent containing a fluorine-containing (meth) acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The antireflection agent is commercially available, for example, as Optool AR-110 (trade name) from Daikin Industries, Ltd.

The surface treatment agent and the curable composition of the present invention may further comprise an antioxidant, a thickener, a leveling agent, an antifoaming agent, an antistatic agent, an antifogging agent, an ultraviolet absorber, a pigment, a dye, an inorganic fine particle such as silica, an aluminum paste, a talc, a glass frit, a filler such as a metal powder, butylated hydroxy toluene (BHT) and a polymerization inhibitor such as phenothiazine (PTZ).

Next, the article of the present invention will be described.

The present invention provides the article comprising a base material and a layer (surface-treating layer) which is formed from the surface treatment agent or the curable composition of the present invention (hereinafter, the surface treatment agent or the curable composition of the present invention are generally referred to as a "surface-treating composition" or a "surface-treating composition") on the surface of the base material. This article can be produced, for example, as follows.

Firstly, the base material is provided. The base material usable in the present invention may be composed of any suitable material such as a glass, a resin (may be a natural or synthetic resin such as a common plastic material, preferably, a polycarbonate resin, a poly(meth)acrylate resin, a polyethylene terephthalate resin, a triacetyl cellulose resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like.

For example, when an article to be produced is an optical member, a material constituting the surface of the base material may be a material for an optical member, for example, a glass or a transparent plastic. Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

Next, the film of the above surface treatment agent of the present invention is formed on the surface of the base material, and the film is post-treated, as necessary, and thereby the surface-treating layer is formed from the surface-treating composition.

The formation of the film of the surface treatment agent of the present invention can be performed by applying the above surface-treating composition on the surface of the base material such that the surface-treating composition coats the surface. The method of coating is not specifically limited. For example, a wet coating method or a dry coating method can be used.

Examples of the wet coating method include dip coating, spin coating, flow coating, spray coating, roll coating, gravure coating, micro-gravure coating, bar coating, die coating, screen printing and a similar method.

When the wet coating method is used, the surface treatment agent of the present invention is diluted with a solvent, and then it is applied to the surface of the base material. As the solvent, the above-mentioned fluorine-containing organic solvent and fluorine-free organic solvent can be used. In view of stability of the surface treatment agent of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether ($C_3F_7OCH_3$), perfluorobutyl methyl ether ($C_4F_9OCH_3$) perfluorobutyl ethyl ether ($C_4F_9OC_2H_5$) and perfluorohexyl methyl ether ($C_2F_5CF(OCH_3)C_3F_7$) (the perfluoroalkyl group and the alkyl group may be liner or branched)), a hydrochlorofluorocarbon (ASAHIKLIN AK-225 (trade name)); a cellosolve solvent such as methyl cellosolve, ethyl cellosolve, methyl cellosolve acetate, ethyl cellosolve acetate; an ester solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone solvent such as acetone, methyl ethyl ketone, methyl isobutyl ketone, 2-hexanone, cyclohexanone, methyl amino ketone, 2-heptanone; an alcohol solvent such as methanol, ethanol, propanol, isopropanol, butanol, diacetone alcohol; an aromatic hydrocarbon such as toluene, xylene, and the like. These solvents may be used alone or as a mixture of or more compound. Among them, hydrofluoroether, the glycol solvent, the ester solvent, the ketone solvent and the alcohol solvent are preferable, and perfluorobutyl methyl ether ($C_4F_9OCH_3$) and/or perfluorobutyl ethyl ether $C_4F_9OC_2H_5$ propylene glycol monomethyl ether, ethyl acetate, butyl acetate, propylene glycol monomethyl ether acetate, methyl isobutyl ketone, isopropanol, butanol and diacetone alcohol are particularly preferable.

Next, the film is post-treated. This post-treatment is performed by irradiation of, for example, an active energy ray, for example, an electromagnetic wave of 350 nm or less, that is, an ultraviolet light, an electron beam, an X-ray, a γ-ray, etc., but are not limited thereto. By performing such post-treatment, curing of a curable moiety in the fluorine-containing and silicon-containing polymer and if present a curable moiety of the hard coating agent are initiated, so that a bond between these compounds or between these compounds and the base material is formed. Such post-treatment contributes to increasing of friction durability of the obtained surface-treating layer.

As described above, the surface-treating layer derived from the surface treatment agent of the present invention is formed on the surface of the base material to produce the article of the present invention. The surface-treating layer thus formed has high surface slip property (or lubricity, for example, wiping property of a fouling such as fingerprints and excellent tactile feeling in a finger) and high friction durability. Furthermore, this surface-treating layer may have water-repellency, oil-repellency, antifouling property (for example, preventing from adhering a fouling such as fingerprints) depending on a composition of the surface-treating composition used, in addition to high friction durability and surface slip property, thus may be suitably used as a functional thin film.

Therefore, the present invention further provides an optical material having the surface-treating layer on the outermost layer.

Examples of the optical material include preferably a variety of optical materials in addition to the optical material for displays, or the like exemplified in below: for example, displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a protective plate of such displays, or that in which these displays and protective plates have been subjected to antireflection treatment on their surface.

The article having the surface-treating layer obtained according to the present invention is not specifically limited to, but may be an optical member. Examples of the optical member include the followings: lens of glasses, or the like; a front surface protective plate, an antiscattering film, an antireflection plate, a polarizing plate, or an anti-glare plate on a display such as PDP and LCD; a touch panel sheet of an instrument such as a mobile phone or a personal digital assistance; a disk surface of an optical disk such as a Blu-ray disk, a DVD disk, a CD-R or MO; an optical fiber, and the like.

The thickness of the surface-treating layer is not specifically limited. For the optical member, the thickness of the surface-treating layer is within the range of 0.1-30 μm, preferably 0.5-20 μm, in view of optical performance, friction durability and antifouling property.

Hereinbefore, the article produced by using the surface treatment agent of the present invention is described in detail. It is noted that an application of the surface treatment agent of the present invention, a method for using the surface treatment agent of the present invention or a method for producing the article are not limited to the above exemplification.

EXAMPLES

The surface treatment agent of the present invention will be described in detail through Examples, although the present invention is not limited to Examples.

Synthesis Example

The fluorine-containing and silicon-containing polymer of the present invention was prepared according to the following scheme.

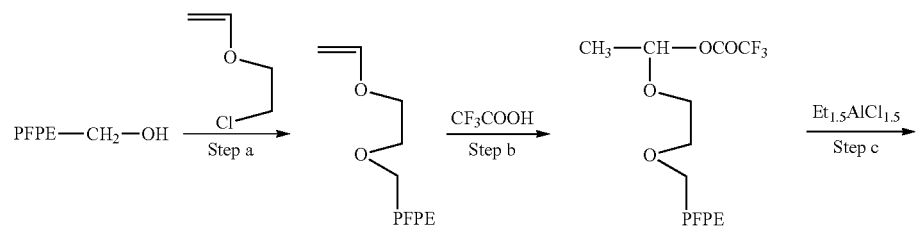

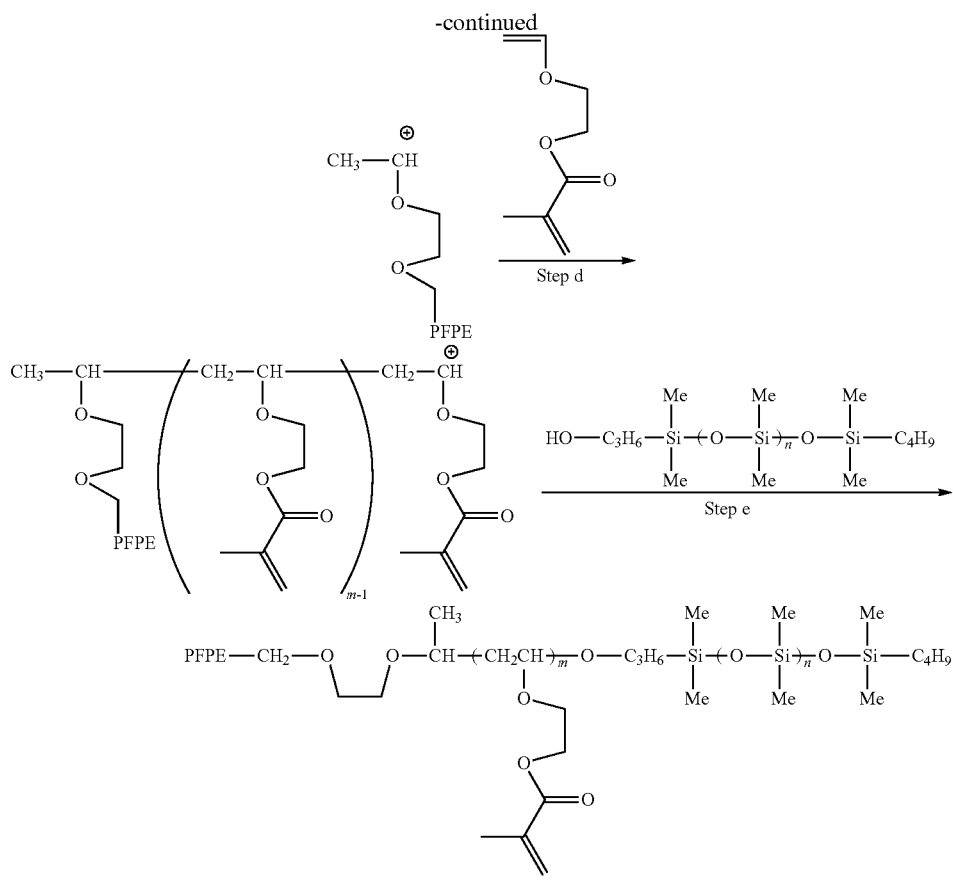

wherein PFPE represents $-CF_3CF_2CF_2O(CF_2CF_2CF_2O)_yCF_2CF_2-$ wherein y is an integer of 10-50, m is an integer of 3-40, and n is an integer of 50-200.

Synthesis Example 1 (Step a)

Synthesis of 2-[3-poly(perfluoropropoxy)-2,2,3,3-tetrafluoropropoxy]ethoxy vinyl ether

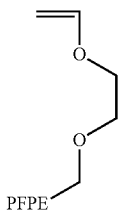

To 1L of an eggplant flask, 60 g (15 mmol) of an perfluoropolyether containing alcohol of the following formula: PFPE-CH$_2$OH (Demnum SA (a number average molecular weight is 4000), Daikin Industries, Ltd.), 3.5g (103 mmol) of tetrabutylammonium hydrogensulfate, 120 mL of 40% aqueous sodium hydroxide solution, and 250 mL of m-hexafluoroxylene were added, and stirred for 30 minutes at a room temperature under a nitrogen atmosphere. To the mixture, 120 mL of 2-chloroethylvinyl ether was added, a dimroth condenser was attached to the eggplant flask, and the mixture was stirred under a nitrogen atmosphere at 70° C. for 48 h. After cooling, the solvent was evaporated with an evaporator until the reaction solution was almost entirely dried. The residual reaction product was dissolved in a fluorine-based inert liquid (Fluorinert FC-72, Sumitomo 3M Ltd.). This solution was extracted with dichloromethane 3 times so that the contaminants were removed. The removal of the contaminants was confirmed by subjecting the extracts to a TLC (eluent: HCFC-225, detecting method: spraying potassium permanganate solution and heating, Evaluation criteria: disappearance of an original spot). The solvent was distilled off under a reduced pressure to obtain 2-[3-poly(perfluoropropoxy)-2,2,3,3-tetrafluoropropoxy]ethylvinyl ether of interest.

Hereinafter, 2-[3-poly(perfluoropropoxy)-2,2,3,3-tetrafluoropropoxy]ethylvinyl ether is referred to as PFPE 4000 VE.

The structure of the interest compound was confirmed by an NMR spectrum.

The NMR spectrum were obtained by JEOL model JNM-ECS400 (measurement solvent: CDCl$_3$-hexafuluorobenzene (1:5)).

With respect to the chemical shifts, a reference substance was TMS in $^1$H-NMR, and CFCl$_3$ in $^{19}$F-NMR, and a downfield side was defined as positive.

$^1$H-NMR (CDCl$_3$-C$_6$F$_E$): δ 3.86-3.91 (2H, m), 3.91-3.96 (3H, m), 4.08 (2H, t, J=13.5 Hz), 4.13 (1H, d-d, J=14.7, 1.8 Hz), 6.40 (1H, d-d, J=14.7, 6.6 Hz)

$^{19}$F-NMR (CDCl$_3$-C$_6$F$_6$): δ −83.12(s), −84.27(s), −84.52(s), −84.82(s), −85.06(s), −85.50(s), −87.36 (t, J=12.5 Hz), − 125.65 (t, J=13.5 Hz), −130.61(s), −130.69(s), −130.79(s), −131.57(s).

A peak of a $CF_2$ group at the β position of the starting alcohol (triplet peak at −128.33 ppm) disappeared, and a triplet peak at −125.65 ppm was detected, thereby confirming the formation of an ether group.

Synthesis Example 2 (Step b)

Synthesis of a PFPE Group Containing Cationic Polymerization Initiator (Concentration: 100 mol/l)

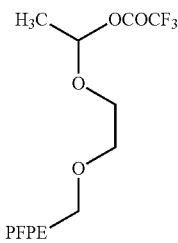

Glasswares for synthesis and polymerization were used after they are dried for 3 hours in a forced convection oven (130° C.). Glass reaction containers A and B provided with three-way stopcock were heated under a nitrogen gas stream, cooled to a room temperature under a nitrogen pressure and making the inner pressure to an atmospheric pressure with a dried nitrogen to sufficiently dry the inside of the containers. To container A, 19.7 mL of HCFC-225 and 0.3 mL (4 mmol) of trifluoroacetic acid were added under a dried nitrogen and sufficiently stirred to obtain 20 mL (200 mol/l) of solution A. To glass container B, 5.9 mL of HCFC-225 and 4.1 mL (2 mmol) of PFPE 4000 VE were added and sufficiently stirred to obtain 10 mL (200 mol/l) of solution B. The diluted solution A and solution B were cooled in an ice-water bath at 0° C. for about 15 minutes. Cooled solution A was slowly added to solution B over about 5 minutes with a nitrogen flow and stirred for 10 minutes to synthesize a PFPE group containing cationic polymerization initiator (obtained amount: 19.5 ml, yield: not less than 99.5%).

Hereinafter, this PFPE group containing cationic polymerization initiator is referred to as PFPE 4000 VETFA.

When PFPE 4000 VETFA was stored, purified PFPE 4000 VETFA was diluted with HCFC-225 to 0.1 M, and added to a brown glass ampule under a dried nitrogen and heat-sealed, and stored at a cold dark place.

Synthesis Example 3 (Steps c-e)

Synthesis of a Fluorine-containing and Silicon-containing Polymer (PFPE-VEM-421)

Glasswares for synthesis and polymerization were used after they are dried for 3 hours in a forced convection oven (130° C.). Glass reaction containers A and B provided with three-way stopcock were heated under a nitrogen gas stream, cooled to a room temperature under a nitrogen pressure and making the inner pressure to an atmospheric pressure with a dried nitrogen to sufficiently dry the inside of the containers. To the container, 4.0 mL of PFPE 4000 VETFA (pre-diluted with HCFC-225 to 0.1 mol/L) (corresponding to 0.2 mmol) as a PFPE group containing cationic polymerization initiator, 9.75 mL of HCFC-225 as a polymerization solvent and 1.0 mL of 1,4-dioxane as an adding base were added under a dried nitrogen. In addition, 1.25 mL (1.6 mmol) of 2-vinyloxyethylmethacrylate (VEM) monomer as a monomer having a curable moiety was added such that the total volume became 16.0 mL. The mixture was cooled to 0° C., stirred with a magnetic stirrer under a nitrogen pressure and on an ice, and was kept at 0° C. To this, 4 mL (0.2 mmol) of ethyl aluminum sesquichloride ($Et_{1.5}AlCl_{1.5}$) which was pre-diluted with HCFC-225 as a polymerization solvent and cooled to 0° C. was quickly added under a dried nitrogen to initiate polymerization, and after 60 minutes, 5 ml of SILAPLANE FM-0421 (silicone having a number average molecular weight of 5000) (manufactured by JNC Corporation) which was a silicone containing an alkanol group at its one terminal was added and stirred for 30 minutes to introduce a silicon-containing polymer moiety into the stopping terminal. Then, 1% of ammonia in methanol was added to completely stop polymerization.

The produced polymer was purified as follows. Firstly, the reaction solution obtained after polymerization was stopped was diluted with HCFC-225. To remove a catalyst residue, a small amount of methanol was added, and the solution was washed with 0.6N HCl aqueous solution 6 times, and with an ion-exchanged water 3 times or more until the washing solution was neutral. This solution was subjected to reprecipitation, and the precipitated desired product was recovered to remove the unreacted silicone. The obtained desired product was recovered and dried, and then was stored at refrigerated under a light-blocking condition.

$^1$H-NMR ($CDCl_3$): δ 0.10-0.40(m), 0.75-0.95(m), 1.00-2.10(m), 2.15-2.40(m), 3.25-3.40(m), 3.40-4.00(m), 4.15-4.40(m), 4.60-4.70(m), 5.25-5.45(m), 5.45-5.80(m), 6.00-6.15(m).

It is suggested from the fact that an olefin proton derived from acrylate was observed at 5.45-5.80 ppm and 6.00-6.15 ppm, and an olefin proton derived from vinyl ether was not observed at 4 ppm and 6.5 ppm that the vinyl ether unit was cation-polymerized and the acrylate unit which was a curable moiety was unreacted and remained.

From the above, it was confirmed that the polymer having the desired structure was obtained.

Synthesis Example 4

Synthesis of a Fluorine-containing and Silicon-containing Polymer (PFPE-VEM-0425)

A fluorine-containing and silicon-containing polymer (PFPE-VEM-0425) was prepared similarly to Synthesis Example except that SILAPLANE FM-0425 (silicone having a molecular weight of 10000) (manufactured by JNC Corporation) (10 ml) was used in place of SILAPLANE FM-0421 (silicone having a molecular weight of 5000). Similarly to PFPE-VEM-0421, it was confirmed that the polymer having the desired structure was obtained.

For the produced polymer, a conversion rate of the monomer (polymerization rate, Conversion) was calculated by using a gravimetric method, and a number average molecular weight (Mn) and Dispersity (Mw/Mn) of the polymer were calculated by using a gel permeation chromatography (GPC). The results were listed in Table.

TABLE 1

| | Conversion rate | Mn | Mw/Mn |
|---|---|---|---|
| PFPE-VEM-0421 | 100 | 9800 | 1.46 |
| PFPE-VEM-0425 | 100 | 11000 | 1.49 |

It was confirmed by the NMR measurement that the polymerization initiator was not remained and the produced polymer had a curable moiety based on the presence of a peak of C=C bond of a acryl group.

Synthesis Example 5

Synthesis of PFPE-VEM (Comparative Compound)

A fluorine-containing polymer having no a siloxane structure (PFPE-VEM) was prepared similarly to Synthesis Example 3 except that methanol (10 ml) was used in place of SILAPLANE FM-0421 (silicone having a molecular weight of 5000). It was confirmed that the polymer having the desired structure was obtained.

Example 1

The fluorine-containing and silicon-containing polymer (PFPE-VEM-0421) (0.3 g) prepared in Synthesis Example 3 was added to a hard coating agent (Beamset 575CB (trade name), manufactured by Arakawa Chemical Industries, Ltd.) (29.67 g) and dissolved in methyl isobutyl ketone (87.5 mL) to obtain 30% by mass of a curable composition.

Example 2

The curable composition of Example 2 was prepared similarly to Example 1 except that the fluorine-containing and silicon-containing polymer prepared in Synthesis Example 4 (PFPE-VEM-0425) (0.3 g) was used in place of the fluorine-containing and silicon-containing polymer prepared in Synthesis Example 3.

Comparative Examples 1-3

The surface treatment agents of Comparative Examples 1-3 were prepared similarly to Example 1 except that the fluorine containing polymer (PFPE-VEM) (0.3 g) prepared in Synthesis Example 5 (Comparative Example 1), SILAPLANE FM-0425 (0.3 g) (Comparative Example 2) or a compound wherein a PFPE moiety and a curable moiety were attached to a commercial available cyclic siloxane backbone (0.3 g) (Comparative Example 3) were added to the hard coating agent in place of the fluorine-containing and silicon-containing polymer of the present invention.

Experiment

Formation of the Surface-treating Layer

A base material of polycarbonate (Stella, manufactured by Nippon Test Panel Co., Ltd.) was immersed in the curable compositions obtained in Examples 1-2 and Comparative Examples 1-3, and dried at 70° C. for 5 minutes. Then, the base material was irradiated with ultraviolet ray of 1 J/cm$^2$ to form a surface-treating layer.

Evaluation

Evaluation of Contact Angle

Static contact angles of water and n-hexadecane (water contact angle and n-hexadecane contact angle) were measured for 1 μL by using a contact angle measuring instrument (manufactured by KYOWA INTERFACE SCIENCE Co., Ltd.). The results are shown in Table 1 below.

Evaluation of Surface Slip Property

Coefficient of dynamic friction (–) was measured by using a surface texture measurement instrument (TriboGear TYPE: 14FW; manufactured by SHINTO Scientific Co., Ltd.) using a steel ball as a friction probe according to ASTM D1894. The results are shown in Table 1 below.

Evaluation of Repelling Property and Wiping Property of an Oil-based Ink

A line was drawn on the surface-treating layer with an oil pen (Mckee (trade name), manufactured by Zebra Co., Ltd.), and the repelling property and the state of the surface-treating layer after allowing the surface-treating layer to stand for one minute and wiping the adhered ink tree times with Kimwipe (trade name, manufactured by Jujo-Kimberly Co., Ltd) were visually evaluated.

Evaluation criteria are as follows.

TABLE 2

| | Repelling property | Wiping property |
|---|---|---|
| ◎ | extremely repel | easily wipeable |
| ○ | repel | wipeable |
| Δ | slightly repel | remaining a few ink |
| x | not repel | not wipeable |

The above results are shown in Table 1.

Table 3

| | Contact angle (degree) | | Coefficient of dynamic friction | Oil-based ink | |
|---|---|---|---|---|---|
| | water | n-hexa decane | | Repelling property | Wiping property |
| Example 1 | 109 | 63 | 0.058 | ◎ | ◎ |
| Example 2 | 109 | 65 | 0.065 | ◎ | ◎ |
| Comparative Example 1 | 105 | 61 | 0.104 | ○ | ○ |
| Comparative Example 2 | 89 | 23 | 0.59 | x | x |
| Comparative Example 3 | 106 | 66 | 0.071 | ○ | ○ |

As understood from Table 3, in Examples 1 and 2 using the fluorine-containing and silicon-containing polymer of the present invention, one or both of the contact angle and the coefficient of dynamic friction were increased in comparison with those in Comparative Example 1 using the fluorine-containing and silicon-free polymer, Comparative Example 2 using silicone, and Comparative Example 3 having a PFPE moiety and the curable moiety and having no polysiloxane backbone. In addition, repelling property and wiping property of oil-based ink were increased. In particular, in Example 1, all of the contact angle and the coefficient of dynamic friction repelling property and wiping property of oil-based ink were increased, thus, synergistic effect was confirmed.

Although the present invention is not bound to any theory, the reason for obtain such effects can be considered as follows. By applying a hybrid structure comprising a perfluoropolyether structure and a polysiloxane structure, the compound of the present invention becomes to have lower surface energy than a compound having a perfluoropolyether structure and a compound having a polysiloxane structure, thereby causing a surface segregation of the perfluoropolyether moiety and the polysiloxane moiety to obtain such effects.

INDUSTRIAL APPLICABILITY

The present invention is suitably applied for forming a surface-treating layer on a surface of various base materials, in particular, an optical member in which transparency is required.

The invention claimed is:

1. A fluorine-containing and silicon-containing polymer of the general formula (A) or (B):

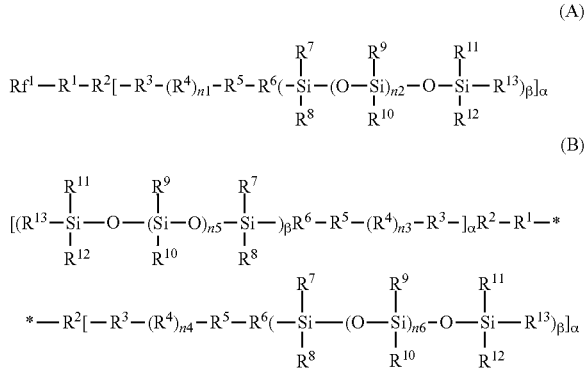

wherein:
Rf$^1$ is an alkyl group having 1-16 carbon atoms which may be substituted by one or more fluorine atoms;
R$^1$ is —(OC$_4$F$_8$)$_a$—(OC$_3$F$_6$)$_b$—(OC$_2$F$_4$)$_c$—(OCF$_2$)$_d$— wherein a, b, c and d are each independently an integer of 0-200, the sum of a, b, c and d is at least 1, and the occurrence order of the respective repeating units in parentheses is not limited in the formula;
R$^2$ is each independently at each occurrence a 2- to 7-valent organic group;
R$^3$ is each independently at each occurrence a divalent organic group;
R$^4$ is each independently at each occurrence R$^{4a}$ or R$^{4b}$: provided that at least one of R$^4$ is R$^{4a}$;
R$^{4a}$ is each independently at each occurrence a divalent organic group having a curable moiety;
R$^{4b}$ is each independently at each occurrence a divalent organic group having no curable moiety;
R$^5$ is each independently at each occurrence —O—, —S—, —NH— or a single bond;
R$^6$ is each independently at each occurrence a 2- to 7-valent organic group;
R$^7$, R$^8$, R$^9$, R$^{10}$, R$^{11}$, R$^{12}$ and R$^{13}$ are, each independently, an alkyl group or an aryl group;
n1 is an integer of 1-50;
n3 and n4 are each independently an integer of 0-50, and the sum of n3 and n4 is one or more;
n2, n5 and n6 are each independently an integer of 0-500;
α is each independently an integer of 1-6; and
β is each independently an integer of 1-6.

2. The fluorine-containing and silicon-containing polymer according to claim 1 wherein in the formulae (A) and (B), R$^2$ is a divalent organic group, and α is 1.

3. The fluorine-containing and silicon-containing polymer according to claim 1 wherein in the formulae (A) and (B), R$^6$ is a divalent organic group, and β is 1.

4. The fluorine-containing and silicon-containing polymer according to claim 1 wherein in the formulae (A) and (B), R$^2$ is a divalent organic group, R$^6$ is a divalent organic group, and α and β are 1.

5. The fluorine-containing and silicon-containing polymer according to claim 1 wherein R$^2$ is —(Q)$_e$-(CFZ)$_f$—(CH$_2$)$_g$— wherein Q is each independently at each occurrence an oxygen atom, phenylene, carbazolylene, —NR$^a$— (wherein R$^a$ represents a hydrogen atom or an organic group) or a divalent organic group, Z is each independently at each occurrence a hydrogen atom, a fluorine atom or a lower fluoroalkyl group, e, f and g are each independently an integer of 0-10, the sum of e, f and g is one or more, and the occurrence order of the respective repeating units in parentheses is not limited in the formula.

6. The fluorine-containing and silicon-containing polymer according to claim 1 which is a fluorine-containing and silicon-containing polymer of the following formula (A1) or (B1):

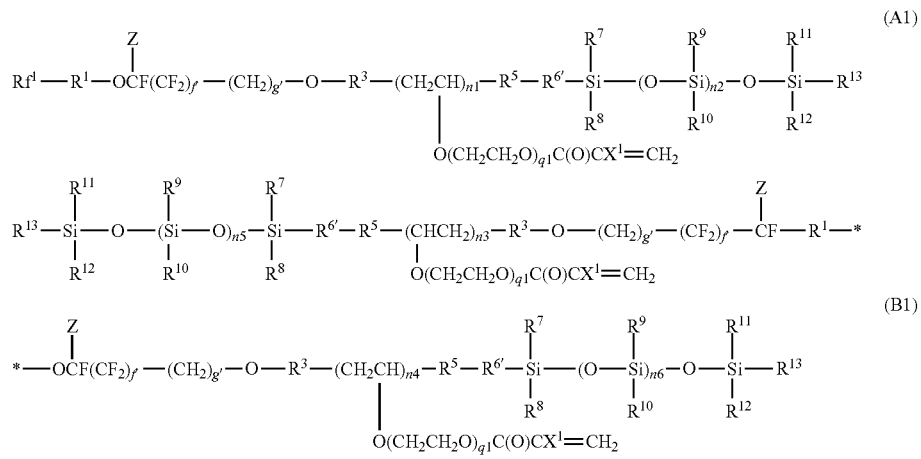

wherein:
Rf$^1$, R$^1$, R$^3$, R$^5$, R$^7$, R$^8$, R$^9$, R$^{10}$, R$^{11}$, R$^{12}$, R$^{13}$, Z, n1, n2, n3, n4, n5 and n6 are as defined in claim 1;
R$^{6'}$ is a divalent organic group corresponding to R$^6$ in claim 1;
X$^1$ is a hydrogen atom, a chlorine atom, a fluorine atom, or an alkyl group having 1-10 carbon atoms which may be substituted by a fluorine atom;
f is each independently at each occurrence 0 or 1;
g' is each independently at each occurrence 1 or 2; and
q1 is each independently at each occurrence an integer of 1-10.

7. The fluorine-containing and silicon-containing polymer according to claim 1 which is a fluorine-containing and silicon-containing polymer of the following formula (A2):

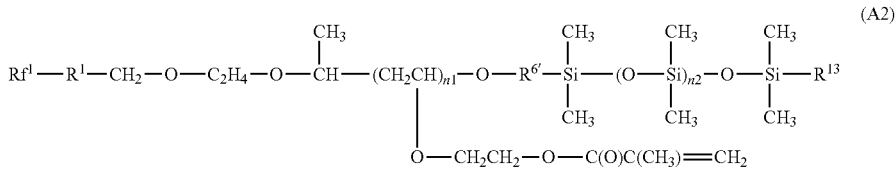

wherein:
Rf¹, R¹, R⁶, R¹³, n1 and n2 are as defined in claim 1, and R⁶′ is a divalent organic group corresponding to R⁶ in claim 1.

8. The fluorine-containing and silicon-containing polymer according to claim 1 wherein R¹ is —(OCF₂CF₂CF₂)$_b$— and b is an integer of 1-200.

9. The fluorine-containing and silicon-containing polymer according to claim 1 wherein R¹ is —(OCF₂CF₂CF₂CF₂)$_a$—(OCF₂CF₂CF₂)$_b$—(OCF₂CF₂)$_c$—(OCF₂)$_d$—, a and b are each independently an integer of 0-30, c and d are each independently an integer of 1-200, and the occurrence order of the respective repeating units in parentheses is not limited in the formula.

10. The fluorine-containing and silicon-containing polymer according to claim 1 wherein Rf¹ is a perfluoroalkyl group having 1-16 carbon atoms.

11. A process for producing the fluorine-containing and silicon-containing polymer of the formulae (A) and (B) according to claim 1 comprising
(1) cationic polymerizing a cationic polymerizable monomer in the presence of a perfluoropolyether group-containing cationic polymerization initiator and a Lewis acid, and
(2) stopping the cationic polymerization reaction by using an alkanol group-containing polysiloxane.

12. The process according to claim 11 wherein the alkanol group-containing polysiloxane is a compound

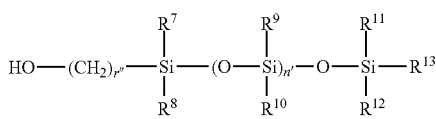

wherein R⁷, R⁸, R⁹, R¹⁰, R¹¹, R¹² and R¹³ are as defined in claim 1;
n′ is an integer of 0-500; and
r″ is an integer of 1-20.

13. The process according to claim 12 wherein the alkanol group-containing polysiloxane has an average molecular weight of 100-20,000.

14. The process according to claim 11 wherein the alkanol group-containing polysiloxane has an average molecular weight of 100-20,000.

15. A surface treatment agent comprising one or more fluorine-containing and silicon-containing polymers according to claim 1.

16. The surface treatment agent according to claim 15 further comprising at least one fluorine-containing oil of the following general formula (C):

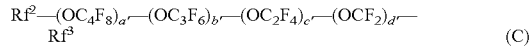

wherein Rf² represents an alkyl group having 1-16 carbon atoms which may be substituted by one or more fluorine atoms,
Rf³ represents a hydrogen atom, a fluorine atom, or an alkyl group having 1-16 carbon atoms which may be substituted by one or more fluorine atoms,
a′, b′, c′ and d′ are each independently an integer of 0 or more and 200 or less, the sum of a′, b′, c′ and d′ is at least one, and the occurrence order of the respective repeating units in parentheses is not limited in the formula,
at 40% by mass or less with respect to the total mass of the fluorine-containing and silicon-containing polymer and the fluorine-containing oil.

17. The surface treatment agent according to claim 16 further comprising a solvent at 5-10,000 parts by mass with respect to the total 100 parts by mass of the fluorine-containing and silicon-containing polymer, and the fluorine-containing oil.

18. The surface treatment agent according to claim 15 further comprising a solvent at 5-10,000 parts by mass with respect to the total 100 parts by mass of the fluorine-containing and silicon-containing polymer.

19. The surface treatment agent according to claim 15 further comprising an active energy curing initiator.

20. A curable composition comprising the fluorine-containing and silicon-containing polymer according to claim 1; and
a matrix forming composition.

21. The curable composition according to claim 20 comprising the fluorine-containing and silicon-containing polymer at 0.01-10% by mass with respect to the total mass of the matrix forming composition and the fluorine-containing and silicon-containing polymer.

22. An article comprising a base material and a layer which is formed on a surface of the base material from the surface treatment agent according to claim 15.

23. The article according to claim 22 which is an optical member.

24. A curable composition comprising the surface treatment agent according to claim 15; and a matrix forming composition.

25. An article comprising a base material and a layer which is formed on a surface of the base material from the curable composition according to claim 20.

* * * * *